US012563081B2

(12) United States Patent
Jou et al.

(10) Patent No.: US 12,563,081 B2
(45) Date of Patent: Feb. 24, 2026

(54) DEFINITION AND EXTENSION OF STORIES OF CORE ENTITIES AND CALCULATION OF RISK SCORES THEREOF

(71) Applicant: OPEN TEXT INC., Wilmington, DE (US)

(72) Inventors: Stephan Fong-Jau Jou, Richmond Hill (CA); Maria Pospelova, Ottawa (CA); Michael John Cyze, Kincardine (CA)

(73) Assignee: Micro Focus LLC, Austin, TX (US)

( * ) Notice: Subject to any disclaimer, the term of this patent is extended or adjusted under 35 U.S.C. 154(b) by 223 days.

(21) Appl. No.: 18/378,915

(22) Filed: Oct. 11, 2023

(65) Prior Publication Data

US 2025/0126144 A1    Apr. 17, 2025

(51) Int. Cl.
*H04L 9/40*        (2022.01)

(52) U.S. Cl.
CPC ...... *H04L 63/1433* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 10,360,387 B2 | 7/2019 | Jou | |
| 11,310,282 B1 * | 4/2022 | Zhang | H04L 63/1425 |
| 2015/0373043 A1 * | 12/2015 | Wang | G06F 21/6254 |
| | | | 706/12 |
| 2016/0344762 A1 * | 11/2016 | Jou | G06F 21/577 |
| 2017/0070523 A1 * | 3/2017 | Bailey | G06F 16/285 |
| 2018/0288063 A1 * | 10/2018 | Koottayi | G06F 21/50 |
| 2018/0367561 A1 * | 12/2018 | Givental | H04L 63/1433 |
| 2020/0195673 A1 * | 6/2020 | Lee | H04L 45/70 |

FOREIGN PATENT DOCUMENTS

| | | | | |
|---|---|---|---|---|
| WO | WO-2022246131 A1 * | 11/2022 | | G06Q 10/06 |

* cited by examiner

*Primary Examiner* — Joseph P Hirl
*Assistant Examiner* — Hassan Saadoun
(74) *Attorney, Agent, or Firm* — Sheridan Ross P.C.

(57) ABSTRACT

Core entities are each defined as a subset of base entities that satisfy one or more core entity connection relationships. Base stories are each defined as a subset of core entities that satisfy one or more story connection relationships. A risk score of each core entity is calculated based on previously calculated risk scores of the base entities. A risk score of each base story is calculated based on the calculated risk score of each core entity of the base story. Selected base stories are extended with external content to generate corresponding extended stories.

20 Claims, 15 Drawing Sheets

100

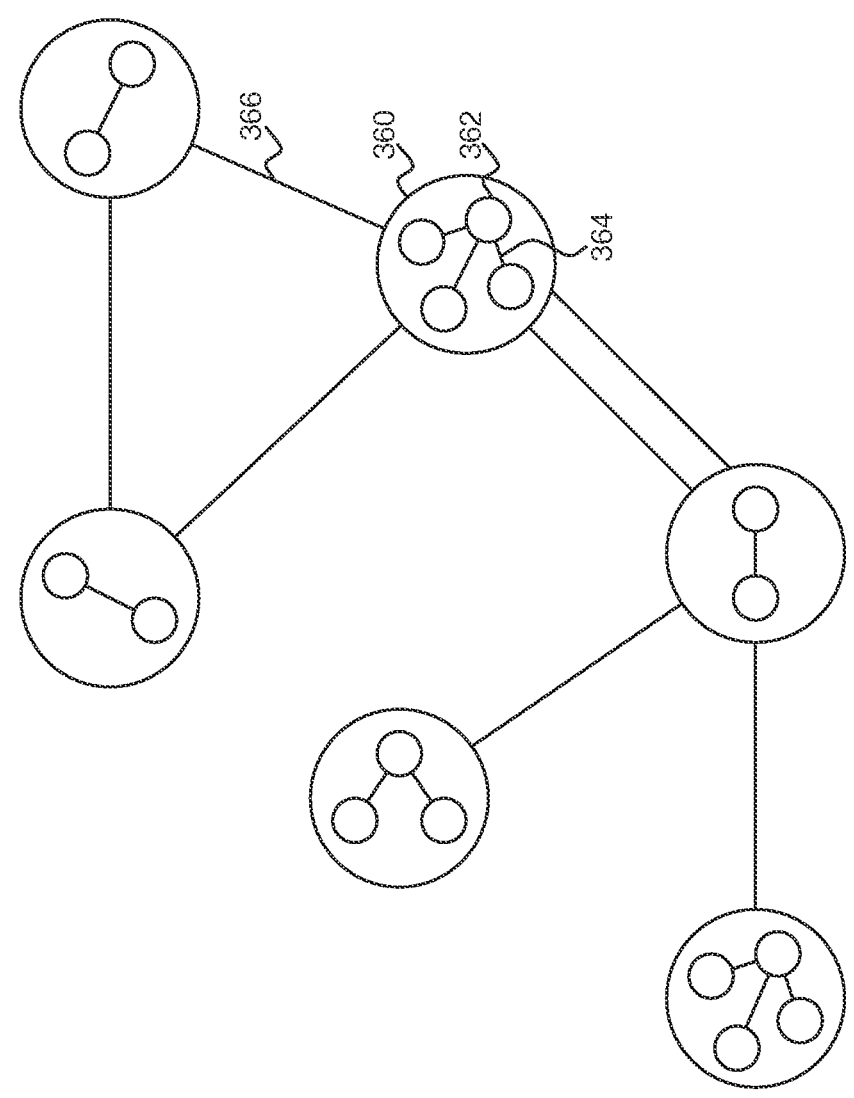
FIG 5

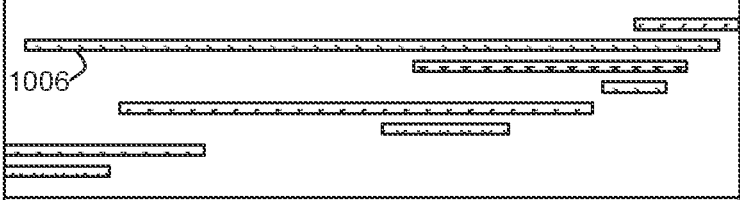

BREAKING! Since Oct 8, 2 PM
ST77309411330

Suspected Brute-Force Attack and Malicious Activity admin-a49dc-sql had an unusually high number of failed
logins and used rare processes like psexec64.exe and
rubeus.exe, suggesting a potential brute-force attack and
malicious activity.

Service Account    Remote Login    Unusual Executables

---

Oct 11, 12AM - Oct 1, 12 AM
ST77309411329

Service Accounts Exhibit Suspicious Behavior with Unusual
Logins and Executables The service account svc_data_backup exhibited suspicious
behavior by using a Remote Interactive logon and running
uncommon executables like hikaru.exe,...

Service Account    Remote Login    Unusual Executables

---

Oct 10, 9 PM - Oct 6, 8 AM
ST77309411328

Mixed Suspicious Activities: Privilege Escalation, Rule
Violation, and Inactivity Unusual use of rare and privileged processes, coupled with
rule violations and inconsistent activity levels, suggests a
multi-faceted security threat.

Service Account    Remote Login    Unusual Executables

---

Oct 10, 1 PM - Oct 8, 7 PM
ST77309411327

Lateral Movement and Abnormal Data Transfers

A concentrated series of high-risk anomalies indicate
potential lateral movement within the network, abnormal data
transfers to external domains, and excessive authentication
attempts.

Service Account    Remote Login    Unusual Executables

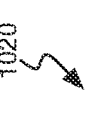
FIG 10B
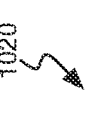

The system account is sending large amounts of data to the IP address 10.10.0.5 at times when this account is normally inactive.

FIG 10D

1060

1062

Paul commented...
This is really weird; we have a series of cmd.exe executions with the same parameters on 3 machines, starting on a machine that hasn't been active in 7 days.

1070

Aviator commented...
Rare multiple executions of netstat.exe occurred within a 3 minute window on 5 different machines.

Aviator commented...
Rare working hours and a large number of rare executable occurred on the machine svc_data_backup.

1072

1068

Playbook: Isolate Accounts
Automatically executed by Aviator.
svc_data_backup,
svc_service_accounting,
svc_service_booking isolated and locked.

1076

Riskiest Users svc_service_booking@contsocorp.com
Aviator: A possible service account triggered multiple correlation rules, used rare processes, and was active during unusual hours.

svc_data_backup@contsocorp.com
Aviator: A possible service account triggered multiple correlation rules, used rare processes, and was active during unusual hours.

bruce.wright.3397@contsocorp.com
Paul commented: Interactions with an abnormally high volume of data, used a rare process, and was active during unusual hours, suggesting potential data exfiltration.

1078

1064

Oct 11, 1 AM
Playbook: Isolate Accounts automatically executed by Aviator. svc_data_backup, svc_service_accounting, svc_service_booking isolated and locked.

Playbook    Isolate Accounts

Oct 10, 9 - 10 AM
It was very unusual that svc_service_booking@contsocorp.com used a process hikaru.exe, which has only been used on 1 day by svc_service_booking@contsocorp.com
Exeution    Rare Processes Used    Endpoint Oct 10, 9 - 10 AM
It was very unusual that svc_service_booking@contsocorp.com used a process reg.exe, which has only been used on 1 day by svc_service_booking@contsocorp.com.
Execution    Rare Processes Used    Endpoint

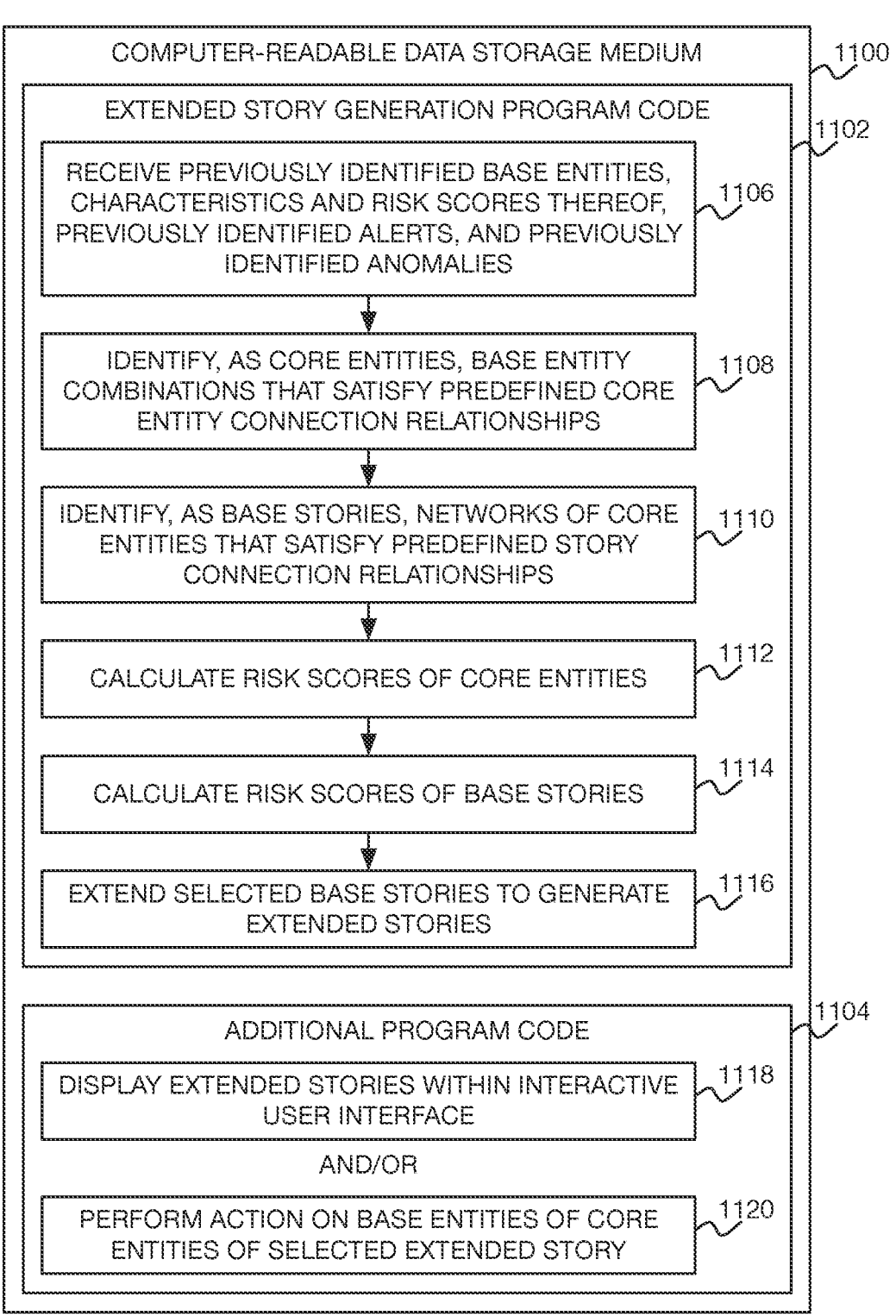

COMPUTER-READABLE DATA STORAGE MEDIUM — 1100

EXTENDED STORY GENERATION PROGRAM CODE — 1102

RECEIVE PREVIOUSLY IDENTIFIED BASE ENTITIES, CHARACTERISTICS AND RISK SCORES THEREOF, PREVIOUSLY IDENTIFIED ALERTS, AND PREVIOUSLY IDENTIFIED ANOMALIES — 1106

IDENTIFY, AS CORE ENTITIES, BASE ENTITY COMBINATIONS THAT SATISFY PREDEFINED CORE ENTITY CONNECTION RELATIONSHIPS — 1108

IDENTIFY, AS BASE STORIES, NETWORKS OF CORE ENTITIES THAT SATISFY PREDEFINED STORY CONNECTION RELATIONSHIPS — 1110

CALCULATE RISK SCORES OF CORE ENTITIES — 1112

CALCULATE RISK SCORES OF BASE STORIES — 1114

EXTEND SELECTED BASE STORIES TO GENERATE EXTENDED STORIES — 1116

ADDITIONAL PROGRAM CODE — 1104

DISPLAY EXTENDED STORIES WITHIN INTERACTIVE USER INTERFACE — 1118

AND/OR

PERFORM ACTION ON BASE ENTITIES OF CORE ENTITIES OF SELECTED EXTENDED STORY — 1120

DEFINITION AND EXTENSION OF STORIES OF CORE ENTITIES AND CALCULATION OF RISK SCORES THEREOF

BACKGROUND

A significant if not the vast majority of computing devices are globally connected to one another via the Internet. While such interconnectedness has resulted in services and functionality almost unimaginable in the pre-Internet world, not all the effects of the Internet have been positive. A downside, for instance, to having a computing device potentially reachable from nearly any other device around the world is the computing device's susceptibility to malicious cyberattacks that likewise were unimaginable decades ago.

These types of cyberattacks are external in nature, in that a system of computing devices is being subjected to a cyberattack from a device external to the system. Internal cyberattacks can also occur. For example, one computing device of a system of computing devices may attack another computing device of the system. Such a system may or may not be connected to external computing devices and systems. For example, the system may be "air-gapped" and not connected to the Internet.

BRIEF DESCRIPTION OF THE DRAWINGS

FIG. 5 is a diagram of an example base story having constituent core entities.

FIGS. 10A, 10B, 10C, and 10D are diagrams of example graphical user interfaces that permit visual inspection of connections among constituent base entities of a story.

FIG. 11 is a diagram of an example non-transitory computer-readable data storage medium.

DETAILED DESCRIPTION

Figure 1:
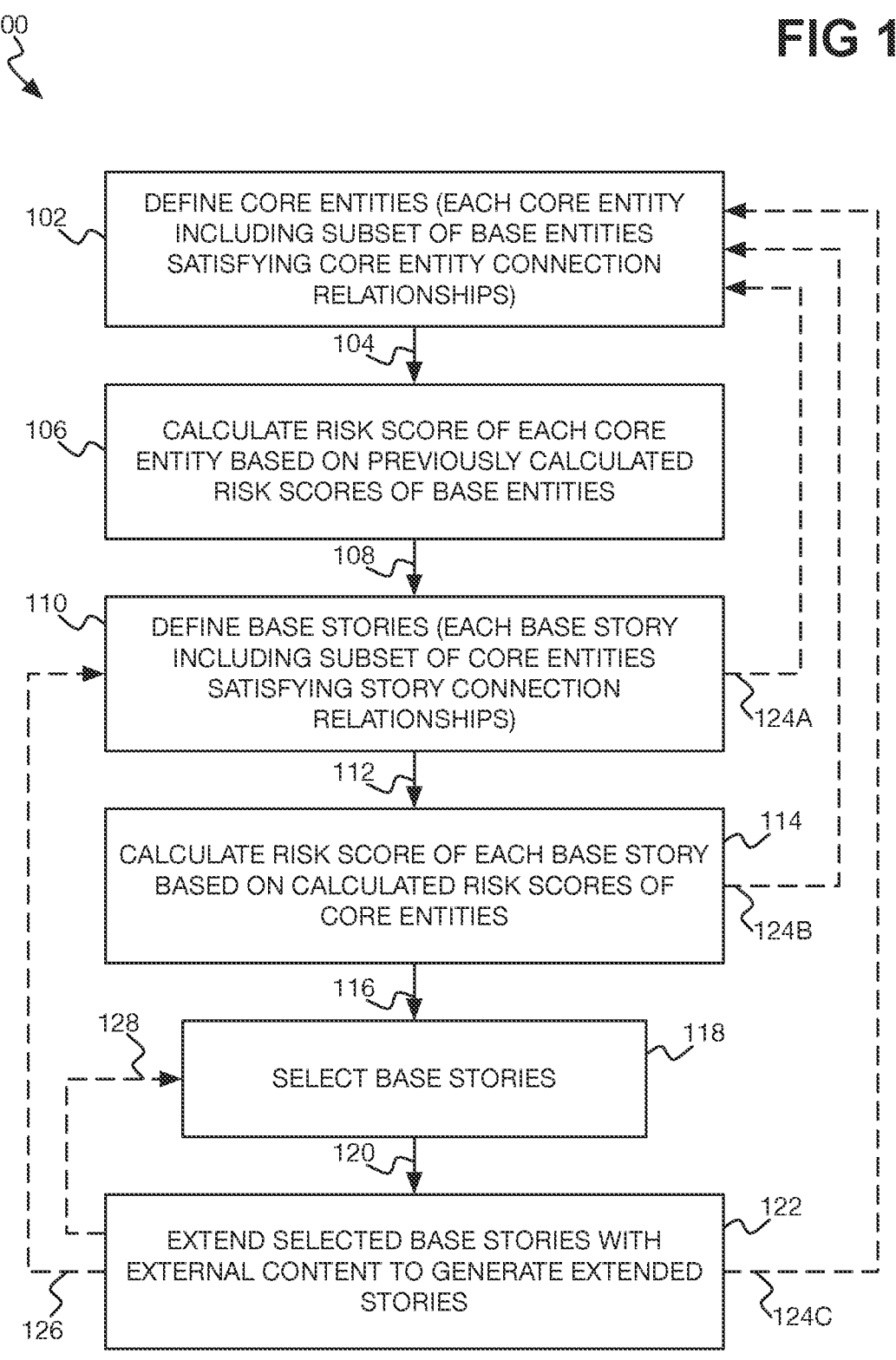
FIG. 1 is a flowchart of an example method for generating and extending base stories of core entities of base entities.

As noted in the background, a large percentage of the world's computing devices can communicate with one another over the Internet, which is generally advantageous. Computing devices like servers, for example, can provide diverse services, including email, remote computing device access, electronic commerce, financial account access, and so on. However, providing such a service can expose a server computing device to cyberattacks, particularly if the software underlying the services has security vulnerabilities that a nefarious party can leverage to cause the application to perform unintended functionality and/or to access the underlying server computing device.

Individual servers and other devices of a target system, including network devices (e.g., firewalls and routers) and computing devices other than server computing devices, may output log entries or other discrete pieces of data that indicate status and other information regarding their hardware, software, and communication. Such communication can include intra- and inter-device communication as well as intra-network (i.e., between devices on the same network) and inter-network (i.e., between devices on different networks, such as devices connected to one another over the Internet) communication.

Such discrete pieces of data may be referred to as raw events. Raw events can also include interactions between users and machines. For example, when a user logs onto a machine, a raw event may be created to indicate this. Similarly, when a universal serial bus (USB) device, such as a USB storage device, is connected to a computing device, a corresponding raw event may be created. As a third example, when a process is executed on a computing device, a raw event may be created to indicate this.

To detect potential security vulnerabilities and potential cyberattacks by nefarious parties, voluminous amounts of raw events may be collected and analyzed in an offline or online manner to identify such security issues or incidents. The terminology raw event is used generally herein, and encompasses all types of data that such devices may output. For example, such data that is encompassed under the rubric of raw events includes that which may be referred to as messages in addition to log events, as well as that which may be stored in databases or files of various formats.

The raw events may further provide information regarding incidents and issues unrelated to security, such as operational issues and business activities. For example, such operational issues can include operational inefficiencies that can be identified in order to improve operational performance. As another example, raw events can be used to derive system characteristics that may provide information and insights for the future design of systems and applications.

In at least some instances, raw data can include device telemetry data. The telemetry data regarding a device includes logs of all processes, access, authentication, and activities that occur on that device. Therefore, for a system of devices, the raw data can include telemetry data as logged by each individual device of the system.

An enterprise or other large organization may have a large number of servers and other devices, within one or multiple target systems, which output raw events. The raw events may be consolidated so that they can be analyzed en masse. Some security and other issues, for instance, may be more easily detected or may only be able to be detected by analyzing interrelationships among the raw events collected by multiple devices of a target system. Analyzing the raw events from just one computing device of a target system may not permit such security or other issues to be detected.

A traditional information and event management (SIEM) system receives raw events from the devices of a target system (e.g., "sources") and provides initial analyses in the form of generated alerts on top of the events. Generation of the alerts is triggered by predefined conditions (e.g., when an event involves a device from a specified list of devices). In addition to such alerts, raw events can lead to generated base entities, anomalies, and risk scores of base entities using an analytical approach that can be referred to as user and behavioral analytics (UEBA).

The UEBA capability may be a separate component from the SIEM capability, or may be included in the same SIEM system, such as an advanced version referred to as next-generation SIEM. The terminology "UEBA system" is used herein to reference the system that generates base entities, anomalies, and risk scores of base entities in addition to generating alerts from the raw events, regardless of whether that capability is a separate component from a SIEM system, or embedded within a SIEM as a next-generation SIEM system.

A UEBA system (in conjunction with a SIEM system) may therefore consolidate the raw events received from the devices of a target system (e.g., "sources") and provide initial analysis to identify security issues. The terminology "security issues" is used generally herein, and encompasses potential and actual cyberattacks and other security threats to which the devices may be currently or have previously been subjected, as well as security vulnerabilities of the devices that may render them vulnerable to such security threats, for instance. A small UEBA system may collect raw events from hundreds of sources, and may receive more than 1,000 raw events per second. A large UEBA system may have thousands of sources, and may receive events numbering in the tens of thousands per second.

Skilled personnel, which may be referred to as security threat hunters, have to be able to efficiently analyze the information collected by a UEBA system to identify security issues to which the devices are currently or have previously been subjected. Due to the voluminous amount of data collected, the UEBA system may provide an initial processing and analysis of the raw events so that the security threat hunters can better identify security issues reflected by the events. The raw events may be processed to generate normalized events, such that each normalized event is formatted in the same manner, for instance, regardless of its source, and where each normalized event may encompass or correspond to a single raw event or multiple raw events.

As noted above, the SIEM system in conjunction with which a UEBA system operates or is a part may provide for predefined rules by which events of interest are identified so that what is referred to as alerts can be generated. The UEBA system may also identify unusual events, which are events that rarely occur, and which are referred to as anomalies. Such alerts and anomalies concern a single entity-such as a single computing device, user account, login, and so on-which is referred to as a base entity herein. An unusual event (i.e., an anomaly) may or may not be an event of interest (i.e., an alert).

The UEBA system may further generate risk scores for base entities based on the alerts and anomalies. The risk score of a base entity is indicative of that entity being (currently or in the past) subject to any security issue. For example, in the issued patent having U.S. Pat. No. 10,360, 387, a given base entity can be specified so that what is referred to as a "story" in the '387 patent is generated concerning the events, such as the alerts and anomalies, referencing that entity. The terminology story as used in the '387 patent is not to be confused with the terminology "base story" and "extended story" as described below, and instead constitutes more of a "simple" story. The '387 patent generates a risk score for such a simple story, which can be considered as the risk score of the base entity of that simple story.

Techniques described herein, by comparison, can leverage the events, anomalies, alerts, base entities (including the characteristics thereof), relationships and connections between and among base entities, as well as base entity risk scores provided by SIEM systems to generate higher level analysis, enhanced inferences, and threat summaries utilizing computers. Risk scores of base entities can be utilized and combined with risk scores of related base entities, thereby forming combined risk scores of base entity groupings.

Also advantageous is that, utilizing computers, base entity groupings (which may also be referred to as entity clusters) can be "bonded" to each other to form super groups of entities linked based on (but not limited to) such factors as entity behaviors, entity attributes, and events relating to entities. Such super groups can be said to form a story of event behavior, much of which can be further processed and classified to understand security issues. In this way, risk scoring can then be applied to such super groups, compared, and ranked for investigation and mitigation. Moreover, by parsing and analyzing voluminous amounts of events, risk calculations, behaviors, entities, relationships and other attributes, the techniques described herein can effectively analyze, summarize and prioritize ("bubble up" so to speak) security threats which can be packaged as stories of interest to threat hunters.

To the extent that the techniques perform data analysis, such processing is not in furtherance of an abstract idea, but rather provide a practical application, namely the improvement of security threat identification technology. Systems and devices that are subject to such identified security issues can therefore be reconfigured to mitigate if not resolve the security issues, and thus improve computing system security. In some cases, for instance, devices that are subject to security issues may automatically have their network connectivity disconnected or otherwise be quarantined until they can be manually inspected and reconfigured.

Moreover, the techniques described herein can provide a user interface by which identified security issues can be visually inspected, as a way to provide a narrative that describes or explains the security issues. The provided user interface is a novel and improved manner by which security threat hunters and other users can interact with the data collected by SIEM and other systems. Such a user interface is therefore a practical application of security threat identification technology, in that users can better discern, understand, and explain security issues by interacting with the user interface.

The techniques described herein identify base stories that are networks of related "core" entities, where each core entity is a combination of related base entities. Furthermore, base stories can be extended with external content to generate corresponding extended stories to further define the security issues that the base stories are indicative of.

FIG. 1 accordingly shows an example method 100 for defining core entities that each constitute a combination of related base entities, for defining base stories that each constitute a network of related core entities, and for extending base stories with external content to generate corresponding extended stories. The depicted method 100 can be traversed linearly from top to bottom, as indicated by solid-line arrows, and can further be traversed iteratively and non-linearly as indicated by dashed-lined arrows. The method 100 can be performed after a UEBA system, such as that of the '387 patent, in conjunction with a SIEM system identifies alerts, anomalies, events, base entities, and risk scores of base entities. That is, the method 100 can receive as input this identified information as output from a UEBA system in conjunction with a SIEM system.

The method 100 includes defining core entities (102). Each core entity is defined as a subset of base entities selected from previously identified base entities, such that the subset satisfies one or more core entity connection relationships. The base entities may have been previously identified by a UEBA system, such as that described in the '387 patent, from security data received from devices of a target system in the form of raw events. Examples of base entities can include users, devices, and device-associated users.

Users may be actual end users (i.e., actual people), such as the employees of an enterprise or other organization. Devices can include computing devices to which the users are individually assigned, such as workstations, laptop, notebook, and desktop computers, smartphones, and other types of computing devices that users do not share with other users. Devices can include shared computing devices as well, including server computing devices that multiple individual users log onto, for instance. As an example, a user may access a virtual machine running on a server using the user's laptop, in which case both the server and the laptop are considered devices.

Device-associated users, by comparison, are users that may not correspond to actual end users. For example, system accounts and network services may be considered device-associated users. System accounts for instance, may log onto computing devices as if they are actual end users, whereas network services may be assigned to (i.e., be run on) computing devices like servers. A local user that corresponds to an actual user may be considered a device-associated user in that it is tied to a specific device (i.e., the device to which it is local).

A combination of base entities that satisfy core entity connection relationships is considered a core entity. Stated another way, a group of base entities that are related to one another is considered a core entity. A given base entity may have a core entity connection relationship with multiple other base entities, such that the group of these base entities constitutes a core entity. In general, base entities may have a core entity connection relationship insofar as they satisfy a common entity characteristic relationship or a common behavior characteristic relationship.

Base entities have a common entity characteristic relationship in that they share a common characteristic. For example, multiple users may use the same device, in which case the base entities representing the users and the device satisfy a same device-multiple user relationship. As another example, the same user or device-associated user may be active on multiple devices, in which case the base entities representing the user and the devices satisfy a same user-multiple device relationship. As a third example, an email account may be connected to an operating system login username, since they concern the same (human) user.

Base entities have a common behavior characteristic relationship in that they exhibit a common behavior. For instance, two entities (e.g., a first entity and a second entity) that are part of the same normalized event may be considered as having a multiple entity-event relationship. As a specific example, the first entity may be a device-associated user that was the source of an event such as a logon activity, whereas the second entity may be the device that was the destination of this event.

The various core entity connection relationships that a subset of base entities satisfies to define a core entity can be predefined. A security threat hunter or other user may define new core entity connection relationships and modify and delete existing relationships. Furthermore, the security threat hunter may manually specify on an ad hoc basis that two or more base entities are sufficiently connected to one another that they may by themselves or with other base entities constitute a core entity.

As an example, the security threat hunter may manually specify that a user is sufficiently connected to two devices such that these three base entities themselves constitute a core entity. As another example, the user may also satisfy a core entity connection relationship with a third device, such that the combination of these four entities (the user, the two devices manually specified by the threat hunter, and the third device) constitute a core entity.

Once the core entities have been defined (102), the method 100 can proceed, per arrow 104, to calculating the risk score of each core entity based on previously calculated risk scores of its constituent base entities (106). The risk score of a base entity is indicative of that base entity being subjected (either currently or previously) to any security issue. In the '387 patent, for instance, the risk score of a simple story that pertains to a given base entity is considered the risk score of that base entity. The approach described in the '387 patent can thus be used to calculate the risk scores of the base entities.

The risk score of a core entity is indicative of its constituent base entities as a whole being subjected (either currently or previously) to any security issue. The risk score of each base entity of a core entity is thus propagated to the core entity to realize the risk score of the core entity as a whole. For example, the average or median of the individual risk scores of a core entity's base entities may be calculated as the risk score of the core entity itself.

The risk score of a core entity may be calculated based on the risk scores of the core entity's base entities in other ways as well. For instance, the individual risk scores of the core entity's base entities may be summed together. A sigmoid function may then be used to both constraint the range of the risk score to a range between 0 and 1 and also provide a bias towards higher risk scores to avoid a large number of low risk scores from concealing a small number of high risk items.

Figure 2:
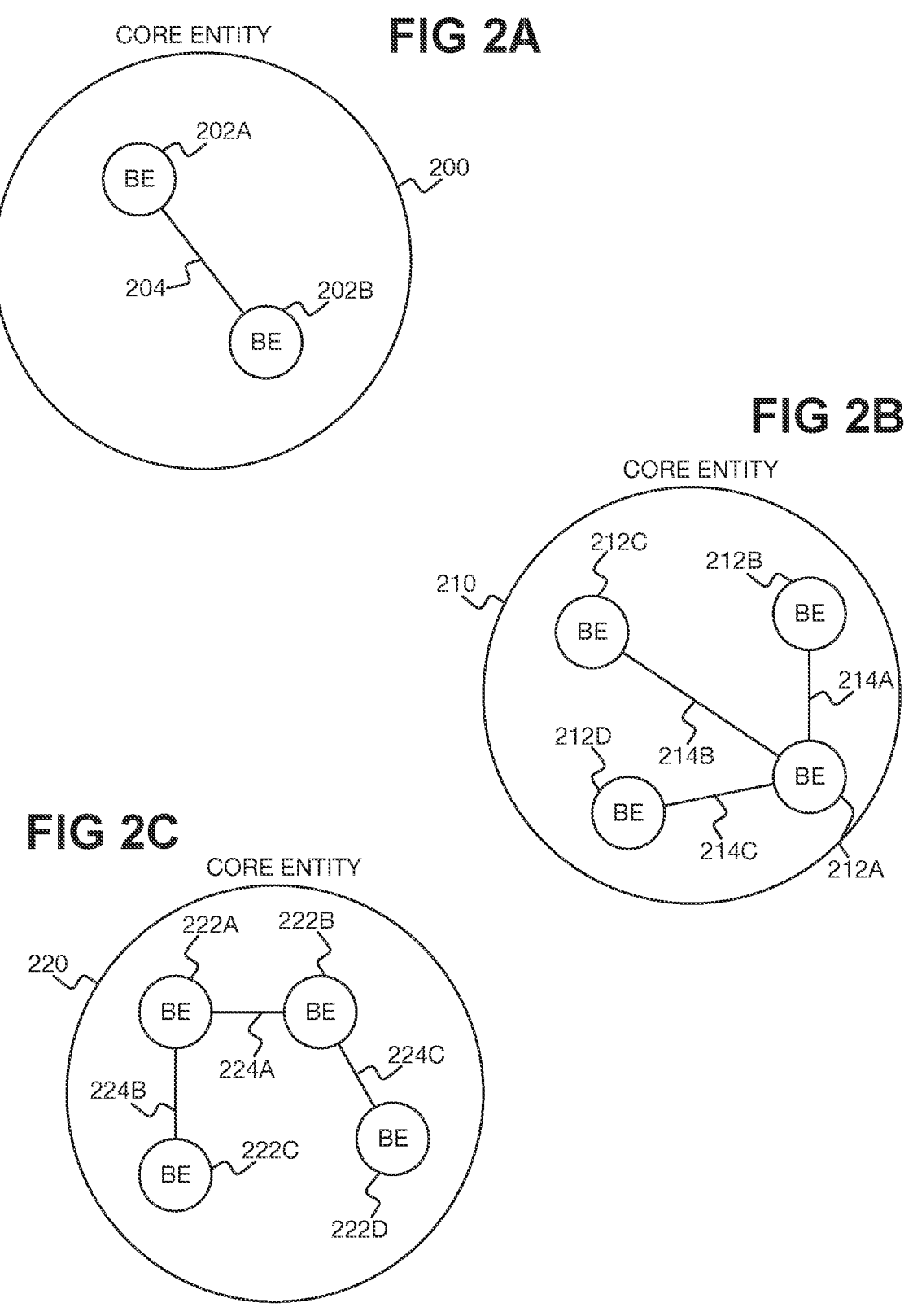
FIGS. 2A, 2B, and 2C are diagrams of example core entities that each include constituent base entities.

FIGS. 2A, 2B, and 2C show different example core entities 200, 210, and 220. The core entity 200 of FIG. 2A includes base entities 202A and 202B, which are collectively referred to as the base entities 202, and which are designated in FIGS. 2A, 2B, and 2C as "BE". The base entities 202 are connected to one another by a connection 204 that represents that the base entities 202 satisfy one or more core entity connection relationships.

The core entity 210 of FIG. 2B includes base entities 212A, 212B, 212C, and 212D, which are collectively referred to as the base entities 212. In the example, the base entity 212A has connections 214A, 214B, and 214C with the base entities 212B, 212C, and 212D, respectively, which are collectively referred to as the connections 214. Each connection 214 represents that the base entity 212A satisfies one or more core entity connection relationships with another of the base entities 212. Stated another way, the base entities 212B, 212C, and 212D are related to one another (and thus are part of the core entity 210) in that they are each related to the same base entity 212A.

The core entity 220 of FIG. 2C includes base entities 222A, 222B, 222C, and 222D, which are collectively referred to as the base entities 222. The base entities 222 are connected via connections 224A, 224B, and 224C, which are collectively referred to as the connection 224. In the example, the base entities 222A and 222B have a connection 224A with one another, such that they satisfy one or more core entity connection relationships.

The base entity 222A also has a connection 224B with the base entity 222C, such that the base entities 222A and 222C satisfy one or more core entity connection relationships. Similarly, the base entity 222B also has a connection 224C with the base entity 222D, such that the base entities 222B and 222D satisfy one or more core entity connection relationships. Stated another way, then, the base entities 222C and 222D are related to one another (and thus are part of the core entity 220) in that the base entity 222A to which the base entity 222C is related is itself related to the base entity 222B to which the base entity 22D is related.

Figure 3:
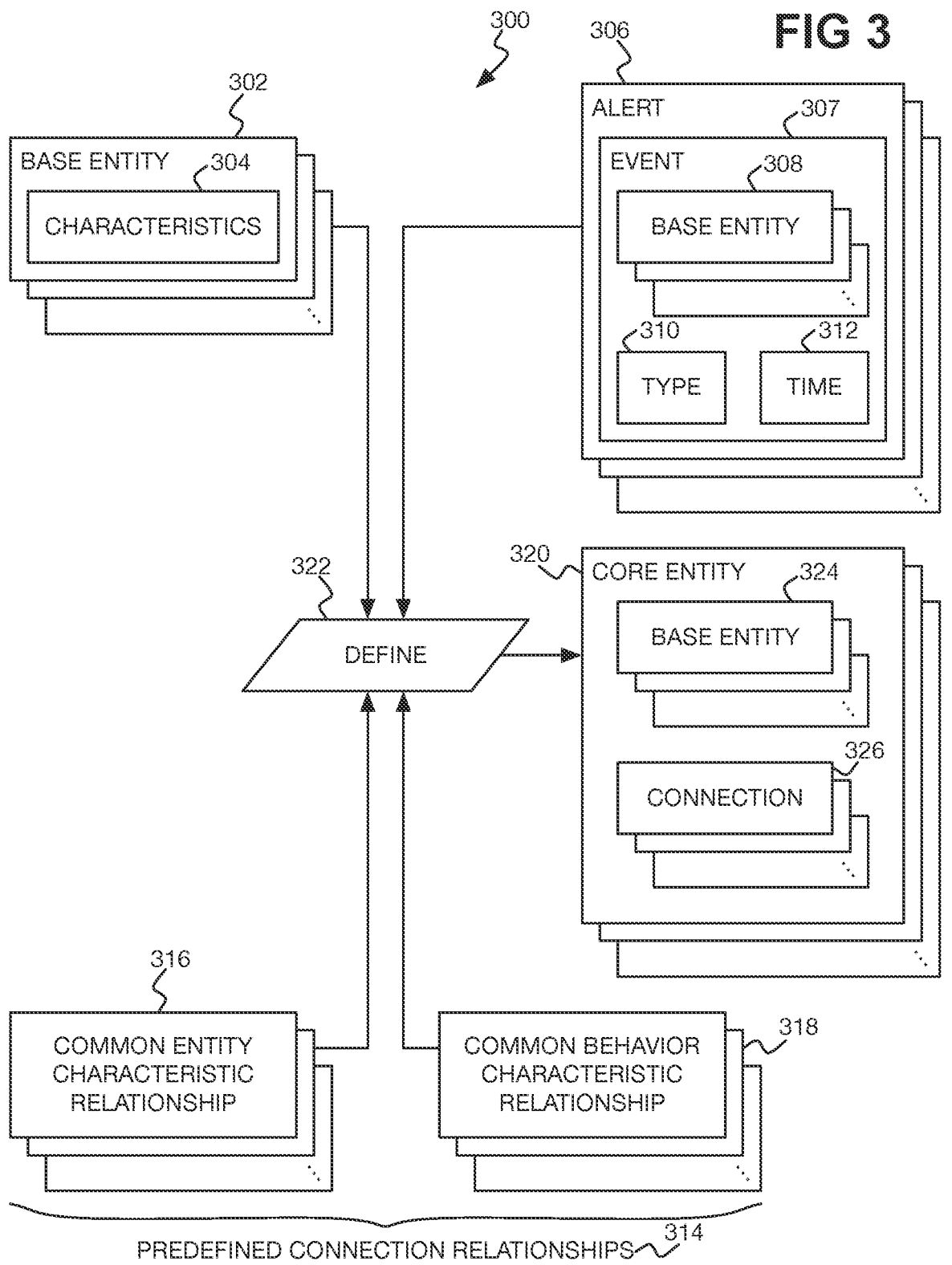
FIG. 3 is a diagram of an example process for defining core entities.

FIG. 3 illustratively depicts an example process 300 by which core entities 320 are defined. Base entities 302 that each have characteristics 304 are depicted in the figure, as are alerts 306 of events 307 of interest. The events 307 of interest may be identified by a SIEM or a UEBA system. For example, the SIEM system may generate normalized events from security data received from devices of a target system in the form of raw events, and then apply predefined rules to identify which of the normalized events are events 307 of interest and thus events 307 for which alerts 306 are generated. Each event 307 may be defined as pertaining to one or more base entities 308, and has an event type 310 and a time 312 of occurrence.

The event type 310 of an event 307 specifies the action or other occurrence that is the subject of the event 307. For example, the event type 310 can be a login by a user (which is one entity 308 of the event 307 in question) onto a computer (which is another entity 308 of the event 307). In this case, the time 312 of the event 307 is when the login occurred. As another example, the event type 310 can be a port scan of a server (which is the entity of the event 307). In this case, the time 312 of the event 307 is when the port scan occurred.

The SIEM or UEBA system that generates the alerts 306 of the events 307 of interest may identify the base entities 302 as including any base entity 308 that appears in any event 307 of interest (i.e., in any alert 306). Thus, a given base entity may be a base entity 308 of multiple events 307, but is represented once in the base entities 302. In another implementation, the base entities 302 may be identified as including any base entity 308 that appears in any event, and not necessarily just events 307 of interest (i.e., alerts 306).

Upon identifying the base entities 302, the SIEM or UEBA system may further generate the characteristics 304 thereof by retrieving the characteristics 304 from a database. For example, the base entities 302 may be identified by a unique identifier. A database may store characteristics 304 of the base entities 302 by identifier, such as the groups to which the base entities 302 belong, the type of the base entities 302, and so on. The characteristics 304 of the base entities 302, in other words, may not be information included in the events 307, but rather information that is retrieved from an external source.

The core entities 320 are defined (322) by identifying the base entities 302 that satisfy predefined core entity connection relationships 314. The predefined connection relationships 314 include common entity characteristic relationships 316 and common behavior characteristic relationships 318. Therefore, combinations of base entities 302 that that satisfy one or more common entity characteristic relationships 316 and/or one or more common behavior characteristic relationships 318 are identified.

For instance, base entities 302 may be deemed as satisfying one or more common entity characteristic relationships 316 by examining their characteristics 304. As one example, base entities 302 may correspond to multiple users that per their characteristics 304 indicate that they are part of a same workgroup. Therefore, the base entities 302 may satisfy a common entity characteristic relationship 316 specifying that base entities 302 of the same workgroup constitute a core entity 320.

Base entities 302 may be deemed as satisfying one or more common behavior characteristic relationships 318 by examining the events 307 that reference the base entities 302. For example, different events 307 of interest may indicate that a shared server has been logged on by different users. Therefore, the base entity 302 corresponding to the shared server and the base entities 302 corresponding to the users constitute a core entity 320.

Each core entity 320 is thus defined as a combination of base entities 324, where each base entity 324 is one of the base entities 302. A given base entity 302 may appear as a base entity 324 in more than one core entity 320. Each core entity 320 is further defined by one or more connections 326 that each correspond to satisfaction of a predefined connection relationship 314. Each connection 326 is between a pair of the base entities 324. Per the examples of FIGS. 2A, 2B, and 2C that have been described, not every pair of base entities 324 in a core entity 320 are directly related to each other by a connection 326, but each base entity 324 is at least indirectly related to every other base entity 324 by one or multiple connections 326.

Defining the core entities 320 by identifying which combinations of base entities 302 satisfy predefined connection relationships 314 based on their characteristics 304 and based on the events 307 in which the base entities 302 appear can result in too many core entities 320 being identified and/or in core entities 320 being identified that have too many constituent base entities 324. To resolve this, just core entities 320 that each include less than a specified threshold number of base entities 324 may be retained. In another implementation, the core entities 320 may be ranked by their constituent numbers of base entities 324, and a specified number of core entities 320 having the fewest base entities 324 retained.

As another example, just core entities 320 that have base entities 324 satisfying a threshold number of predefined connection relationships 314 may be retained, or both a threshold number of common entity characteristic relationships 316 and a threshold number of common behavior characteristic relationships 318. In another implementation, the predefined connection relationships 314 may include an importance value. Therefore, for each core entity 320, an overall importance value may be determined by adding the importance values of the individual connections 326, and just the core entities 320 having overall importance values greater than a threshold retained.

Figure 4:
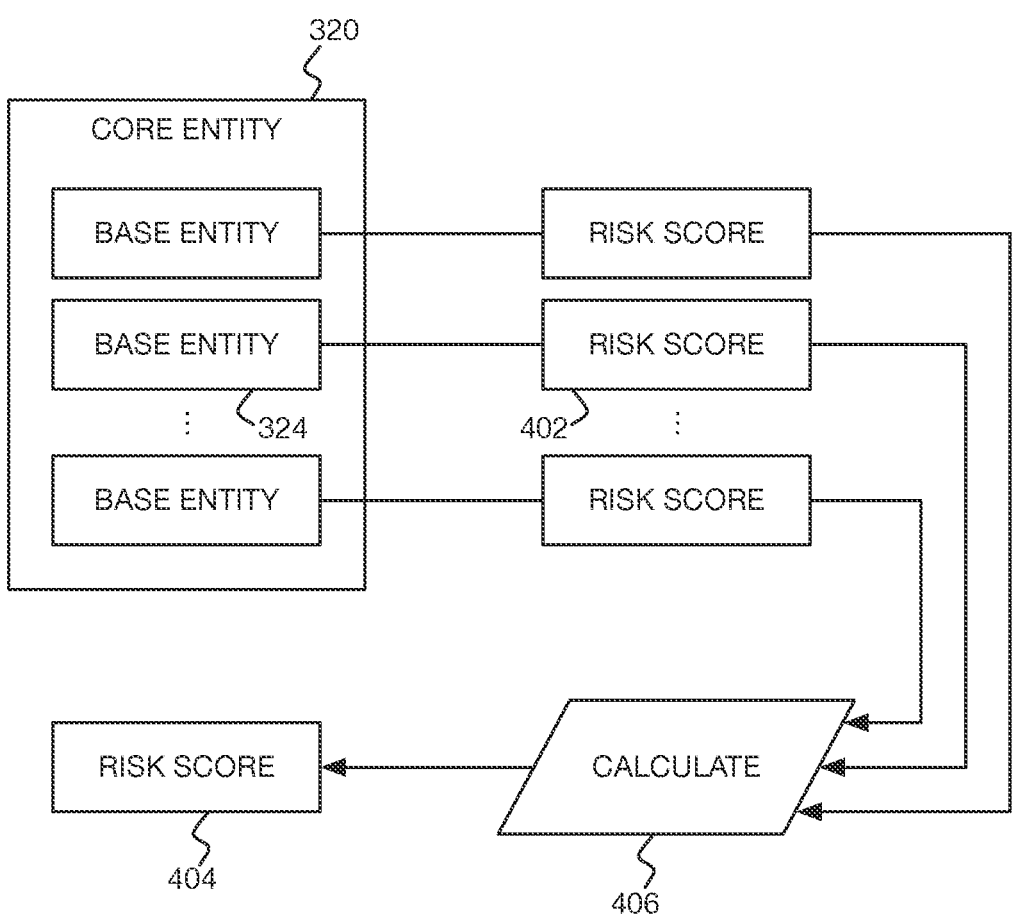
FIG. 4 is a diagram of an example process for calculating a risk score for a core entity based on risk scores of its constituent base entities.

FIG. 4 illustratively depicts an example process by which the risk score 404 of a core entity 320 is calculated. The core entity 320 includes multiple base entities 324 that respectively have previously calculated risk scores 402, which may be the risk scores calculated by a UEBA system, such as that of the '387 patent, for simple stores pertaining to the base entities 324. The overall risk score 404 of the core entity 320 is therefore calculated (406) based on the risk scores 402 of the constituent base entities 324 of that core entity 320, such as the average or median of the risk scores 402. The risk scores 402 of the base entities 324 may be propagated to the core entity 320 to generate the risk score 404 of the core entity 320 in other ways as well.

Referring back to FIG. 1, once the risk score of each core entity has been calculated (106), the method 100 can proceed, per arrow 108, to defining base stories (110). Each base story is defined as a network or subset of core entities selected from the core entities that have been defined, such that the network or subset satisfies one or more story connection relationships. That is, a network or subset of core entities satisfying one or more story connection relationships is considered a base story.

The terminology "base" story is used to differentiate the story defined in (106) from its subsequent extension with external content to generate a corresponding "extended" story, and to differentiate the story from a "simple" story corresponding to a single base entity that can be defined per the '387 patent. A network or subset of core entities relates to a common security issue over a subset of events that have occurred within a period of time. That is, the manner by which a base story is defined herein is so that it includes the core entities that have been subjected to a common security issue over events occurring within a period of time.

For example, a sustained, concerted cyberattack over a period of days by a group of related malicious actors on the resources of an enterprise. A base story corresponding to such a cyberattack thus can be used to define and explain the overall cyberattack. Without the definition of the base story, the enterprise may fail to discern that disparate small parts of the cyberattack on different resources of the enterprise are indeed part of a single overarching attack.

An example of a story connection relationship is a multiple entity-anomaly or multiple entity-alert relationship in which a base entity of a first core entity and a base entity of a second core entity are part of the same particular anomaly (i.e., the same unusual event) or are part of the same alert (i.e., the same event of interest). For instance, a device-associated user may have logon credentials for a server, and ordinarily successfully log onto the server. Therefore, if there is an unsuccessful logon of the server by the user as indicated by an anomaly, then the core entity including the user and the core entity including the server satisfy a story connection relationship such that the two core entities are part of the same base story.

Another example of a story connection relationship is a multiple entity-common anomaly or multiple entity-common alert relationship such that base entities of multiple core entities were subjected to a same type of anomaly or alert. For instance, a first server of a first core entity and a different, second server of a second core entity may both have been subjected to a port scan originating from the same external network address, as indicated by a first anomaly for the first server and a different, second anomaly for the second server. Therefore, the first and second core entities satisfy a story connection relationship such that they are part of the same base story.

The various story connection relationships that a subset or network of core entities satisfies can be predefined. A security threat hunter or other user may define new story connection relationships and modify and delete existing relationship. Furthermore, the security threat hunter may manually specify on an ad hoc basis that two or more core entities are sufficiently connected to one another that they may by themselves or in conjunction with other core entities constitute a base story.

As an example, the security threat hunter may manually specify that multiple core entities are subject to are part of the same common security issue, and therefore should belong to the same base story. These manually specified core entities may be the only core entities of the base story. However, as another example, one or more of the manually specified core entities may be determined as satisfying story connection relationships with other, different core entities, such that the base story includes both the latter core entities and the former, manually specified core entities.

Once the base stories have been defined (110), the method 100 can linearly proceed, per arrow 112, to calculating the risk score of each base story based on the risk scores of its constituent core entities that have been calculated (114). The method 100 may instead, however, proceed back to defining the core entities (102), per arrow 124A. For example, the security threat hunter or other user may, upon reviewing the base stories that have been defined, identify that additional core entities should be defined to add to the base stories.

The risk score of a base story is indicative of the core entities of that base story being subjected (either currently or previously) to any security issue. This risk score, as well as the risk scores of the base entities and the core entities themselves, may be indicative of the severity of such a security issue, and/or the likelihood that the security issue is actually occurring. For example, the product of the severity of the security issue and the likelihood that it is actually occurring may be the risk score.

The risk score of a base story can be calculated as the mean or median of the risk scores of its constituent core entities. More generally, the risk scores of a base story's core entities are propagated to the base story as a whole to generate the risk score of the base story. Rather than calculate the mean or median of the risk scores of the core entities of a base story to calculate the base story's risk score, the risk score of each core entity may be weighted by the number of base entities it includes, or in another manner, such that, for instance, the sum of the weighted risk scores is calculated as the base story's risk score. The risk score of a story may further itself be weighted by secondary characteristics of the story, such as the number of base entities in the story, the time span encompassed by the story, the variety and composition of the story connections interconnecting core entities of the story, and so on.

Once the risk scores of the base stories have been calculated (112), the method 100 can linearly proceed, per arrow 116, to selecting one or more of these stories (118). The method 100 may, however, instead proceed back to defining the core entities (102), per arrow 124B. For instance, the security threat hunter or other user may, upon reviewing the risk scores of the base stories, determine that additional core entities should be defined to add to the base stories.

The base stories that are selected may be those having the highest risk scores. For example, each base story having a risk score greater than a threshold may be selected, regardless of the number of base stories that are selected. As another example, the base stories may be ordered by risk score, and a specified number of the base stories having the highest risk scores selected, regardless of whether the risk score of every selected base story is greater than the threshold. In a third example, no more than a specified number of the base stories having the highest risk scores may be selected, where each base story has a risk score greater than the threshold. The security threat hunter or other user may also manually select the base stories.

FIG. 5 shows an example base story 500. The base story 500 includes core entities 360 that each include base entities 362 connected by connections 364. The core entities 360 are themselves connected by connections 366 that each represent the satisfaction of a base story connection relationship. Specifically, each connection 366 represents that a pair of core entities 360 satisfies a base story connection relationship, where a given pair of core entities 360 can satisfy more than one such relationship and therefore have more than one connection 366 between them.

The base story 500 is a network of the core entities 360 in that each core entity 360 is at least indirectly connected to every other core entity 360 by at least one connection 366. For example, a first core entity 360 may be directly connected by a first connection 366 to a second core entity 360, which is directly connected by a second connection to a third core entity 360. The first and third core entities 360 are thus indirectly (but not directly) connected to one another, via the second core entity 360.

Figure 6:
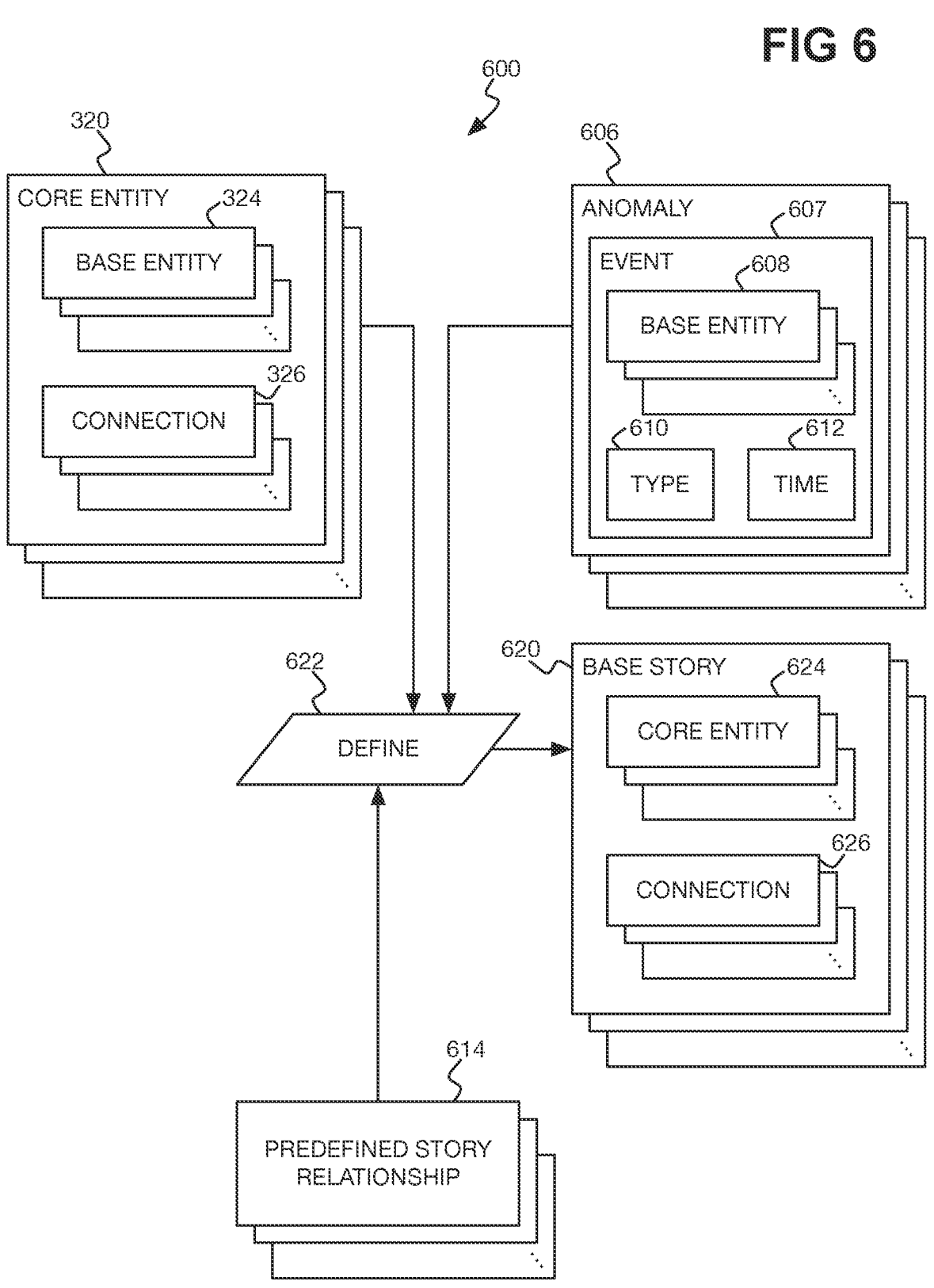
FIG. 6 is a diagram of an example process for defining base stories.

FIG. 6 illustratively depicts an example process 600 by which base stories 620 are defined. The previously defined core entities 320 that each have base entities 324 and one or more connections 326 are depicted, as are anomalies 606 of events 607 of interest. The events 607 may be normalized events that a SIEM or a UEBA system, such as that described in the '387 patent, generates from security data received from devices of a target system in the form of raw events, and then identified as being unusually occurring (i.e., rare) events.

Which normalized events are rare events 607 and thus anomalies 606 may be determined by the UEBA system identifying those of the events 607 that occur least frequently. As another example, which normalized events are rare events 607 may be determined by applying predefined rules. The events 607 that are anomalies 606 may be a subset of the events 307 of interest in FIG. 3 (i.e., an anomalous event 607 is necessarily an event 307 of interest), or the events 607 that are anomalies 606 may overlap the events 307 of interest (i.e., an anomalous event 607 is not necessarily an event 307 of interest). Each event 607 may be defined as pertaining to one or more base entities 608, and have an event type 610 and a time 612 of occurrence, as with the events 307.

The base stories 620 are defined (622) by identifying the core entities 320 that satisfy predefined story relationships 614, based on the anomalies 606. In one implementation, for instance, whether each unique pair of core entities 320 satisfies any predefined story relationship 614 may be determined. These unique pairs of core entities 320 can then be merged together to define networks of related entities 320, where each network corresponds to a different base story 620.

For example, core entities A and B may satisfy a predefined story relationship 614, core entities B and C may satisfy a predefined story relationship 614, core entities D and E may satisfy a predefined story relationship 614, and core entities E and F may satisfy a predefined story relationship 614. Therefore, merging these unique core entity pairs results in two networks: a network including core entities A, B, and C, where the core entities A and C are linked via the common core entity B, and a network including core entities D, E, and F, where the core entities D and F are linked via the common core entity E. As such, two base stories 620 are defined.

Core entities 320 can be deemed as satisfying one or more predefined story relationships 614 by examining the events 607 that are anomalies 606 and that reference the base entities 608 of the core entities 320. For example, execution of a process by a base entity 608 that is a system account (i.e., a device-associated user) on a base entity 608 that is a server (i.e., a device) may have been blocked, as reflected in an event 607. The event 607 is unusual, and therefore is considered an anomaly 606. The core entity 320 including the system account and the core entity 320 including the server may therefore be deemed as satisfying a predefined story relationship 614.

Each base story 620 is defined as a network of core entities 624, where each core entity 624 is one of the core entities 320. Each core entity 320 can appear as a core entity 624 in at most one base story 620, since if the core entity 320 appears in two networks, the networks are merged together to form one base story 620. (Note that this is different from base entities 324 vis-à-vis core entities 320, where a base entity 324 can appear in multiple core entities 320), where each base story 620 is further defined by one or more connections 626 that each correspond to satisfaction of a predefined story relationship 614. Each connection 626 is between a pair of the core entities 624.

Defining the base stories 620 by identifying which networks of core entities 320 satisfy predefined story relationships 614 based on the anomalies 606 can result in too many and/or too small base stories 620 being identified (e.g., base stories 620 having too few core entities 624) and/or in too few and/or too large base stories 620 being identified (e.g., base stories 620 having too many core entities 624). In the former instance, additional predefined story relationships 614 may be added to link multiple base stories 620 into a single base story 620 to create fewer, larger base stories 620. In the latter instance, existing predefined story relationships 614 may be removed to sever connections 626 of base stories 620 representing these relationships 614, to split each such base story 620 into multiple, smaller base stories 620.

The connections 626 that relate core entities 624 of base entities 324 within a base story 620 are different than the connections 326 that relate base entities 324 within a core entity 320. That is, the predefined story relationships 614 represented by the connections 626 of a base story 620 are different types of relationships than the predefined core entity connection relationships 314 represented by the connections 326 of a core entity 320. The purpose of a core entity 320 is to identify base entities 324 that are related to one another by their characteristics or behaviors, regardless of (and not taking into account) whether the base entities 324 are being or have been subjected to a common security issue (e.g., incident). By comparison, the purpose of a base story is to identified core entities 320 that are related to one another in that they are being or have been subject to a common security issue.

Figure 7:
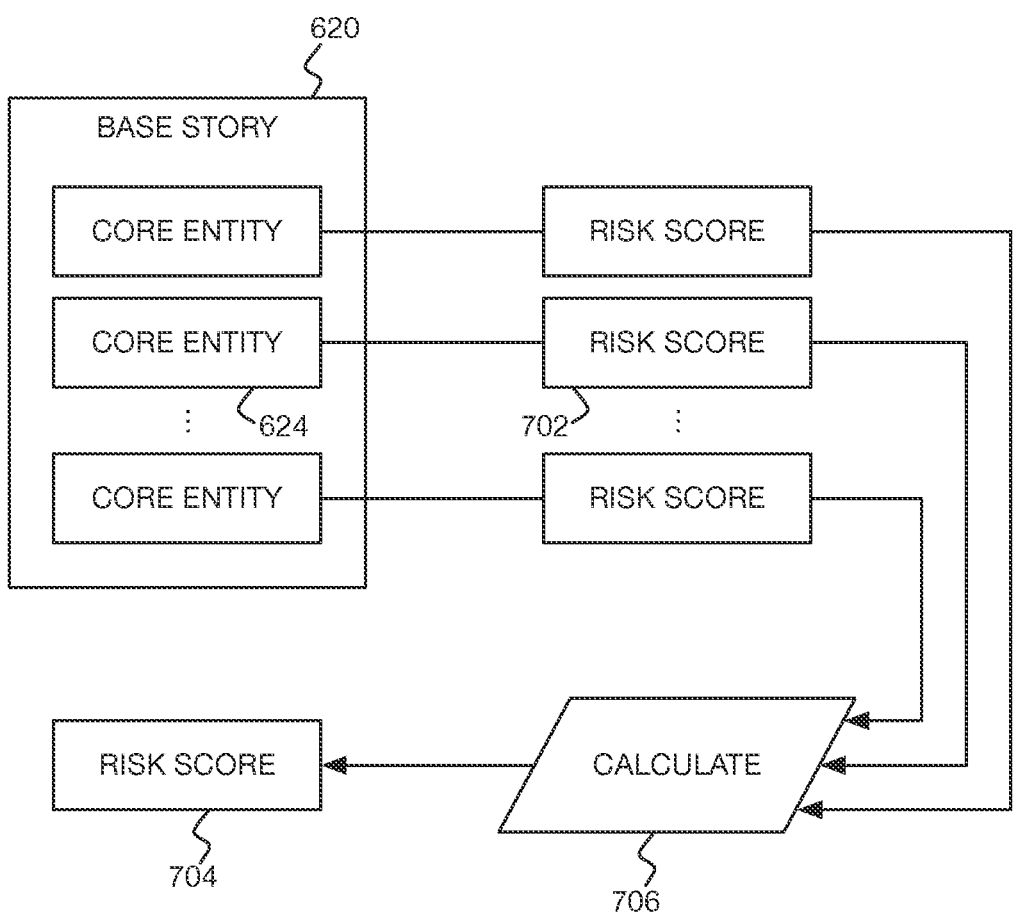
FIG. 7 is a diagram of an example process for calculating a risk score for a base story based on risk scores of its constituent core entities.

FIG. 7 illustratively depicts an example process by which the risk score 704 of a base story 620 is calculated. The base story 620 includes multiple core entities 624 respectively having risk scores 702 that have been calculated based on the risk scores of their constituent base entities as has been described. The overall risk score 704 of the base story 620 is therefore calculated (706) based on the risk scores 702 of the constituent core entities 624 of that base story 620, such as the average or median of the risk scores 702. The risk scores 702 may be propagated to the base story 620 to generate the risk score 704 in other ways as well.

Referring back to FIG. 1, once the one or more of the defined base stories have been selected (118), the method 100 can proceed, per arrow 120, to extending the selected base stories with external content to generate extended stories (122). Thereafter, the method 100 can be proceed per arrow 124C proceed back to defining or redefining core entities (102), per arrow 126 back to defining or redefining the base stories (110), or per arrow 128 back to selecting different base stories (118). That is, the method 100 can be iteratively performed at various parts, to redefine core entities and/or base entities as desired.

Extending a base story via external content further defines the security issue of the base story. That is, the external content can be used to provide additional information regarding or as the explanation of the security issue. The external content can include information that is not reflected in the normalized events (i.e., in the alerts or the anomalies), and thus is external to the information on which basis the core entities and the base stories have themselves been generated.

For instance, while alerts and anomalies can indicate that base entities have been subjected to port scans originating from specifies network addresses, the events may not themselves indicate which network addresses are known to be (i.e., have been identified as being) potentially dangerous. Instead, reputational information for network addresses (e.g., Internet Protocol (IP) addresses and/or uniform resource locator (URL) addresses) may have been compiled, monitored, and stored by an external network address reputation analyzer. For example, via such external reputation information retrieved from an external network address reputation analyzer, it may be known that a particular network address has been the source of cyberattacks in the past. Therefore, a port scan that would not ordinarily be considered as being dangerous may nevertheless be deemed dangerous if it originates from this network address.

Similarly, while alerts and anomalies may indicate certain processes have been initiated on base entities, the events themselves do not necessarily indicate which processes rarely occur historically. For example, in a given time period, security data in the form of raw events may indicate that a given process has been initiated frequently on a particular base entity in a set time period. During this time period, then, the process is not unusual in that it does not rarely occur in that time period. However, historically the process may rarely occur. Therefore, that such a process has been initiated should still be identified as being of importance.

Figure 8:
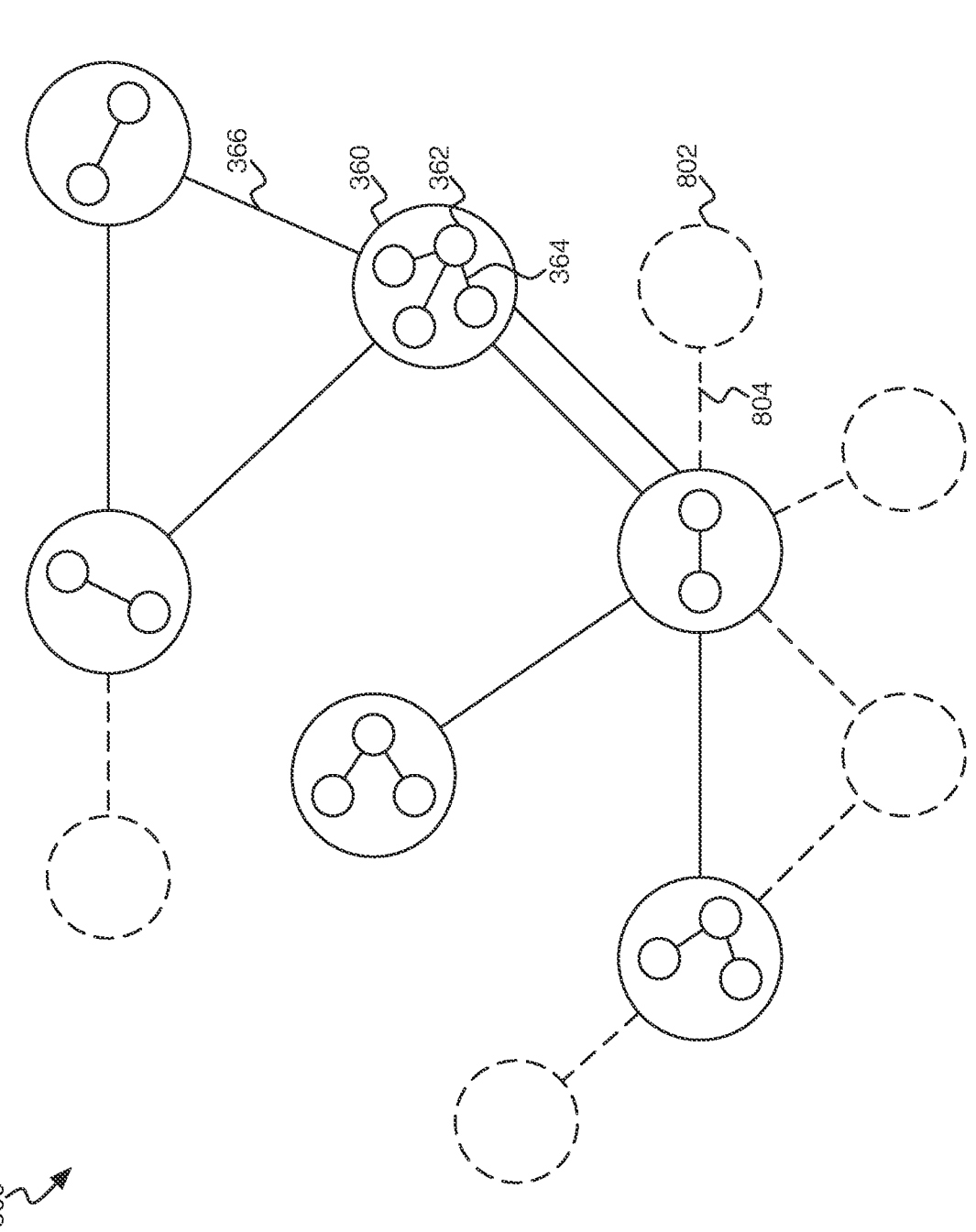
FIG. 8 is a diagram of an example extended story, which is a base story extended with external content.

FIG. 8 shows an example extended story 800, which corresponds to the base story 500 of FIG. 5. The extended story 800, like the base story 500, thus includes core entities 360 that each include base entities 362 connected by connections 364 representing core entity connection relationships, where the core entities 360 are themselves connected by connections 366 representing base story connections. The extended story 800, however, also includes external components 802 and external connections 804 that are depicted in dashed-line form, where each external component 802 is connected by an external connection 804 to a core entity 360.

An external component 802 corresponds to external content that is referenced within an event of an anomaly or alert that includes a base entity 362 of the core entity 360 to which the external component 802 is connected. The external connection 804 in this case may indicate the type of the event in question. For example, the external component 802 may identify a network address that is known to be potentially dangerous, and that was indicated in an event as being the origin of a port scan of a base entity 362 of the core entity 360. The external connection 804 thus signifies a port scan, by the external component 802 (i.e., a potentially dangerous network address) on the core entity 360 (i.e., a base entity 362 thereof).

Figure 9:
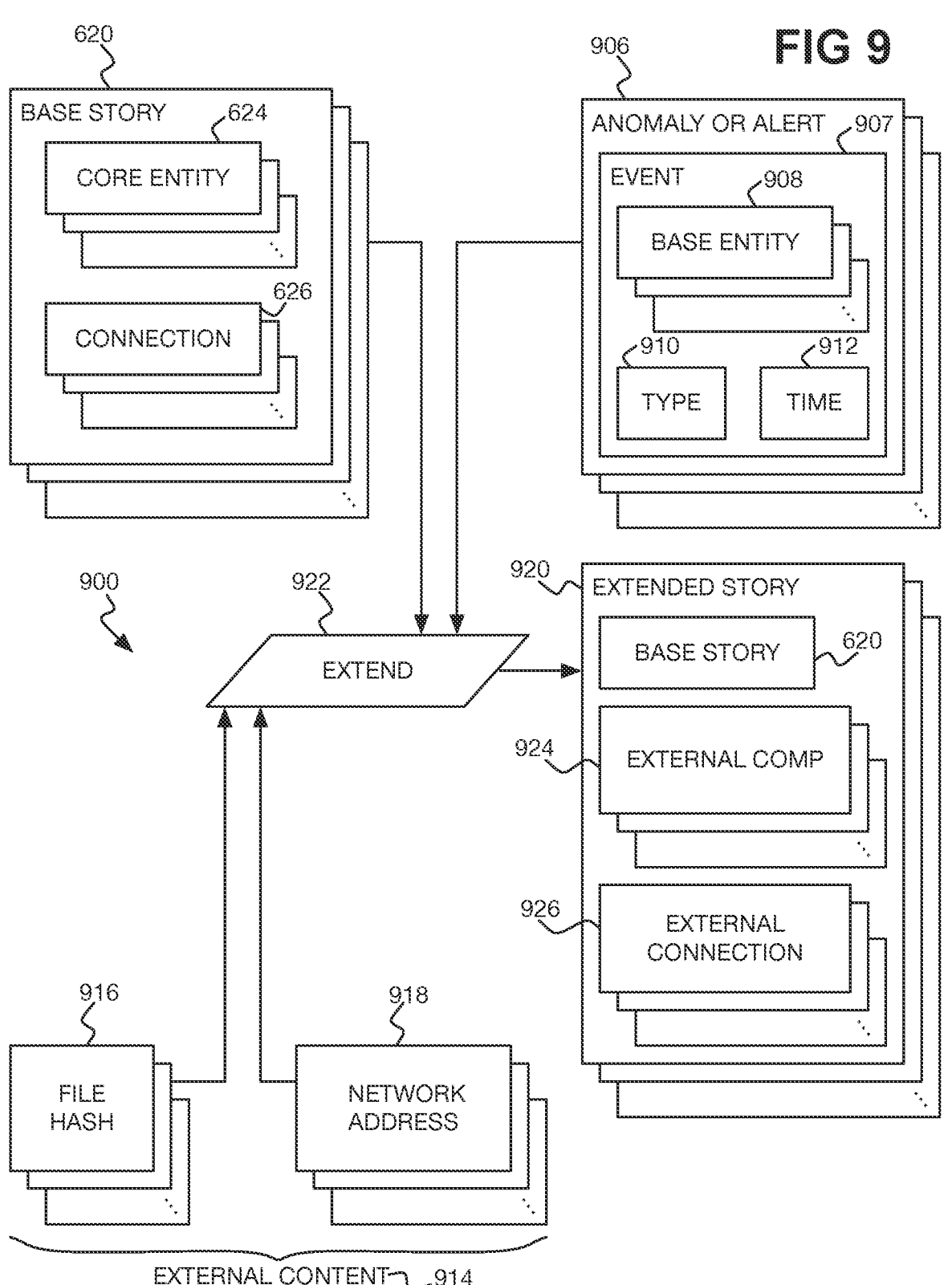
FIG. 9 is a diagram of an example process for defining extended stories.

FIG. 9 illustratively depicts an example process 900 by which base stories 620 are extended with external content 914 to generate corresponding extended stories 920. The previously defined base stories 620 that each have core entities 624 and one or more connections 626 are depicted, as are anomalies and alerts 906 of events 907, where each anomaly or alert 906 specifies an unusual event 907 or an event 907 of interest. The events 907 may be normalized events that a UEBA system identified as unusual or of interest, and each pertains to one or more base entities 908, and each has an event type 910 and a time 912 of occurrence, as has been noted above.

The base stories 620 are extended (922) to generate the corresponding extended stories 920 by identifying which of the events 907 that reference external content 914 also reference base entities 908 that are part of the core entities 624 of the base stories 620. The external content 914 can include, for instance, a list of hashes 916 of file binaries corresponding to processes that are known to be malicious, and a list of potentially dangerous network addresses 918 (i.e., addresses that are known to initiate potentially dangerous actions).

The events 907 that reference any hash 916 or any network address 918 are thus identified. The base entities 908 of each such event 907 are inspected to identify whether they are part of any is a constituent base entity of core entities 624 of the base stories 620. Therefore, a core entity 624 of a base story 620 includes a base entity 908 of an event 907 referencing such external content 914, then the base story 620 is extended with the external content 914 in question in its corresponding extended story 920.

Each extended story 920 is thus defined as a base story 620 extended by external components 924 and external connection 926. Each external component 924 has a corresponding external connection 926 and represents external content 914 (e.g., a hash 916 or a network address 918) referenced within an event 907 that pertains to a base entity 908 included in a core entity 624 of that base story 620. The corresponding external connection 926 connects this core entity 624 to the external component 924, and signifies the type 910 of the event 907 in question.

So that the base stories 620 are not extended with too much external content 914 in their corresponding extended stories 920, a security threat hunter or other user may be able to remove selected external components 924 from the extended stories 920. The security threat hunter may also or instead be able to identify which types of external content 914 should be referenced when generating the extended stories 920 to avoid too much such content 914 being included. The security threat hunter may further be able to add ad hoc external components 924 to the extended stories 920, linked via to the core entities 624 of the extended stories 920 via ad hoc connections 926, as desired.

Figure 10C:

FIGS. 10A, 10B, 10C, and 10D are diagrams of example graphical user interfaces (GUIs) 1000, 1020, 1040, and 1060, respectively, which permit visual inspection of connections among constituent base entities of a story. Referring to FIG. 10A, the example GUI 1000 provides for user selection of a story that is to have its connections visually inspected. The GUI 1000 includes areas 1002 and 1004.

The area 1002 includes a number of bars 1006 that correspond to available stories that can be selected for visual inspection. If there are more stories available than can fit vertically in the area 1002, a user is able to vertically scroll through the available stories so that a subset thereof is concurrently displayed in the area 1002. The bars 1006 can have different colors, as signified by shading in the figure, corresponding to the risk scores of their stories.

For example, a lowest possible risk score may correspond to yellow, and a highest possible risk score may correspond to red, such that risk scores between the lowest and highest risk scores have colors within a gradient between yellow and red. A risk score half-way between the lowest and highest risk scores may be orange, which is a combination of half yellow and half red. Therefore, a first risk score that is lower than a second risk score is more yellow than red, whereas the second risk score is more red than yellow.

The area 1002 from left to right corresponds to a window of time, with the left side corresponding to an earlier time and the right side corresponding to a later time. Horizontal scrolling can be provided so that the window of time to which the area 1002 corresponds is more recent or more distant in time. Zooming in and out can also be provided so that the window of time to which the area 1002 corresponds is longer or shorter.

The left side of each bar 1006 is positioned at the time the security issue to which the corresponding story in question started, and the right side of each bar 1006 is positioned at the time the security issue ended. The length of each bar 1006 is the overall length of time of the security issue of the corresponding story. If a security issue is still ongoing, then the length of the corresponding bar 1006 will increase until the security issue ends.

The area 1004 includes a number of sections 1008 that correspond to available stories that can be selected for visual inspection. In the example, the stories in the sections 1008 correspond to the stories of the top-most four bars 1006 in the area 1002. If there are more stories available than can fit vertically in the area 1004, a user is able to vertically scroll through the available stories such that a subset thereof is concurrently displayed in the area 1004.

Each section 1008 can begin with the date and time when the security issue of the corresponding story began. A story that has not yet ended may be denoted by a phrase such as "BREAKING" or "STILL ONGOING" prior to the start date and time to indicate that it has not yet ended. The date and time may be in the same color as the story's corresponding bar 1006 in the area 1002.

Each section 1008 can include, on the line below the date and time, a unique identifier of the corresponding story (e.g., "S17730941329"). On the line below that, each section 1008 may include a title of the security issue of the corresponding story (e.g., "Service Accounts Exhibit Suspicious Behavior with Unusual Logins and Executables"). Below the title, each section 1008 may include a short summary of the security issue. The title and the short summary may be generated via a large-language machine learning model applied to the names and characteristics of the base entities that are part of the story and the events corresponding to the story connections of the story.

Referring to FIG. 10B, the example GUI 1020 provides for visual inspection of the connections among constituent base entities of a selected story, as may have been selected using the GUI 1000 of FIG. 10A. The GUI 1020 includes a ring 1022 divided into sections 1024 corresponding to different types of base entities that are part of the story. In the depicted example, the different types include "device," "user," "domain" (i.e., network domain), "process," and "IP" (i.e., Internet Protocol network address).

The GUI 1020 includes circles 1026 corresponding to the base entities that are part of the stories, where each circle 1026 is positioned adjacent to the interior edge of the ring 1022 along the section 1024 for the type of the base entity of that circle 1026. The name 1028 of each base entity radially extends outwards from a position adjacent the exterior edge of the ring 1022 opposite its respectively circle 1026 (e.g., "DESKTOP-QJ5PM").

The size of each circle 1026 can correspond to a volume or frequency of an interaction of its respective base entity, such as the number of times a process was executed, the number of transmissions to a network address, and so on. The colors of the circles 1026 can correspond to the risk scores of their base entities. In the example, this is depicted by the circles 1026 of base entities having higher risk scores being filled in, and the circles 1026 of base entities having lower risk scores not filled in.

Curved lines 1030, such as splines and other types of curved lines, represent story connections between the base entities of corresponding circles 1026. Each curved line 1030 connects a pair of circles 1026 of the base entities of a corresponding story connection. A story connection as has been described is between two core entities, and corresponds to an event between the base entity of one core entity and the base entity of another core entity that satisfies a story connection relationship.

The thickness of each curved line 1030 can correspond to a volume of frequency of an interaction of its respective connection. For example, if a connection is between a process and a network address, the volume or frequency may be the relative number of times the process communicated with that network address. The colors of the curved lines 1030 can correspond to whether the corresponding event is an anomaly or other event. In the example, anomalies are depicted as solid lines, whereas events that are not anomalies are depicted as hollow lines. The base entities connected by an anomaly do not necessarily have to have higher risk scores, and either or both of the base entities connected by an event that is not an anomaly may have higher risk scores.

Referring to FIG. 10C, the example GUI 1040 corresponds to the example GUI 1020 when a GUI pointer, such as an arrow, is stationarily positioned over a curved line 1030 for a threshold length of time, which is known as "hovering." Such stationary positioning over a curved line 1030 causes display of a box 1042 that provides information regarding the connection corresponding to the curved line 1030 in question.

In the example, the curved line 1030 that is being hovered over corresponds to the connection between the IP address "10.10.0.5" and the user "svc_data_back". Therefore, the box 1042 provides information regarding the event between these two base entities to which the curved line 1030. Once the GUI pointer is moved so that it is no longer positioned over the curved line 1030, the box 1042 is no longer displayed.

Referring to FIG. 10D, the example GUI 1060 also provides for visual inspection of a selected story, as may have been selected using the GUI 1000 of FIG. 10A. The GUI 1060 includes areas 1062, 1064, and 1066. The area 1062 includes a matrix timeline 1068 of the selected story. The area from left to right corresponds to a window of time, with the left side corresponding to an earlier time and the right side corresponding to a later time. Horizontal scrolling can be provided so that the window of time to which the area 1062 corresponds is more recent or later in time.

The area 1062 includes elements 1070 plotted again the matrix timeline 1068, which are depicted in the example as squares. The elements 1070 correspond to the story's constituent connections (e.g., events that satisfy story connection relationships). Each element 1070 is positioned horizontally along the timeline 1068 in correspondence with when its respective event occurred.

The elements 1070 are vertically organized along the timeline 1068 according to whether their respective events are anomalies or not. The colors of the elements 1070 may also correspond to whether their respective events are anomalies or not. For example, elements 1070 corresponding to anomalies may be displayed in a different color than and vertically above elements corresponding to events that are not anomalies.

The area 1062 can include informational comments 1072 proximate to related elements 1070. The comments 1072 provide supplemental information regarding the events of particular story connections (or groups of connections) of these elements 1070. A comment 1072 may correspond to the same information that is provided in the box 1042 when hovering over a curved line 1030 in FIG. 10C for the same event, or may be a summary of multiple such events generated by applying a large-language machine learning model to the events. A comment 1072 may also be manually added by a user.

The area 1062 can further include at least one informational notification 1076 concerning actions that may have been automatically performed to mitigate the security issue to which the story corresponds. In the depicted example, the processes "svc_data_backup," "svc_service_account," and "svc_service_booking" have been isolated and locked. These base entities, in other words, have been quarantined.

The area 1064 includes sections 1078 that correspond to the base entities of the story. Base entities can be selected by type and/or risk score. In the depicted example, the riskiest users (i.e., the base entities that are users and that have the highest risk scores) are shown. If there are more base entities than can vertically fit in the area 1064, a user can vertically scroll through the base entities so that a subset thereof is concurrently displayed in the area 1064.

Each section 1078 can begin with the name of a corresponding base entity. The name of the base entity may be in a color corresponding to its risk score. Following the name, a section 1078 includes a summarization of the story connections pertaining to its corresponding base entity (e.g., the events satisfying story connection relationships that reference the base entity). The summarization may be produced through generative artificial intelligence (AI) techniques, such as those involving large language models (LLMs).

The area 1066 includes sections 1080 that correspond to the story's constituent connections, as well as to notifications 1076, in temporal order. A user is able to vertically scroll through the connections of the story so that a subset thereof is concurrently displayed in the section 1080. Each section 1080 can begin with the date and time of its corresponding connection or notification 1076.

For sections 1080 that represent connections, the date and time may be in a color corresponding to whether their respective events are anomalies or not. For sections 1080 that represent notifications 1076, the date and time may be in a different color. Following the date and time, a section 1080 includes a summarization of its respective event or the text of its respective notification 1076.

Selection of a story within the GUI 1000 of FIG. 10A may first result in the GUI 1020 of FIG. 10B being display for that story. When a curved line 1030 is hovered over, the GUI 1020 transitions to the GUI 1040 of FIG. 10C, and when the line 1030 is no longer hovered over, the GUI 1040 transitions back to the GUI 1020. A GUI element such as a button or other control may be selected to transition from the GUI 1020 or the GUI 1040 to the GUI 1060 of FIG. 10D, or back to the GUI 1000 to select a different story. Similarly, a GUI element in the GUI 1060 may be selected to transition to the GUI 1020 or back to the GUI 1000.

FIG. 11 shows an example non-transitory computer-readable data storage medium 1100. The storage medium 1100 may be a volatile storage medium such as a semiconductor medium like a dynamic random-access memory (DRAM), or may be a non-volatile storage medium such as a solid-state drive (SSD), a flash memory, a hard-disk drive (HDD), and so on. The storage medium 1100 stores extended story generation program code 1102 and can further store additional program code 1104. The program code 1102 and the program code 1104 are executable by a processor of a computing device to perform processing.

The processing performed when executing the program code 1102 is consistent with the method 100 that has been described. The processing thus includes receiving previously identified base entities and characteristics thereof, previously identified alerts and anomalies, and previously generated risk scores (1106). The previously generated alerts and anomalies are of events that have occurred, where alerts pertain to events of interest and the anomalies pertain to unusual events. The previously generated risk scores correspond to the base entities, and are indicative of the base entities being subjected to any security issue.

The processing includes identifying, as core entities, base entity combinations (1108). Each base entity combination includes a subset of base entities that either or both have a common characteristic and exhibit common behavior, based on the characteristics and the previously identified alerts that have been received. The processing includes identifying, as base stories, networks of core entities (1110). Each network of core entities relates to a common security issue over a subset of the events within a period of time, based on the previously identified anomalies that have been received.

The processing includes calculating a risk score of each core entity based on the previously generated risk scores of the base entities (1112), and calculating a risk score of each base story based on the calculated risk score of each core entity of the base story (1114). The processing includes extending the base stories with external content to generate corresponding extended stories to provide further definition of the common security issue via the external content (1116).

The processing performed when executing the additional program code 1104 includes displaying the corresponding extended stories within an interactive user interface (1118). The interactive user interface permits a user to visually inspect connections among the base entities of the core entities of a selected corresponding extended story. The user interface may be the user interface that has been described with reference to FIGS. 10A-10D.

The processing can further or instead include performing an action in relation to the base entities of the core entities of a selected extended story (1120). Performance of the action can resolve an anomaly contributing to the risk score of the selected corresponding extended story, in order to lower the risk score. For instance, the base entities of the core entities of the selected extended story may be reconfigured. As one example, the network connectivity of the base entities may be restricted to mitigate the deleterious effects of any security issue that may be occurring.

Figure 12:
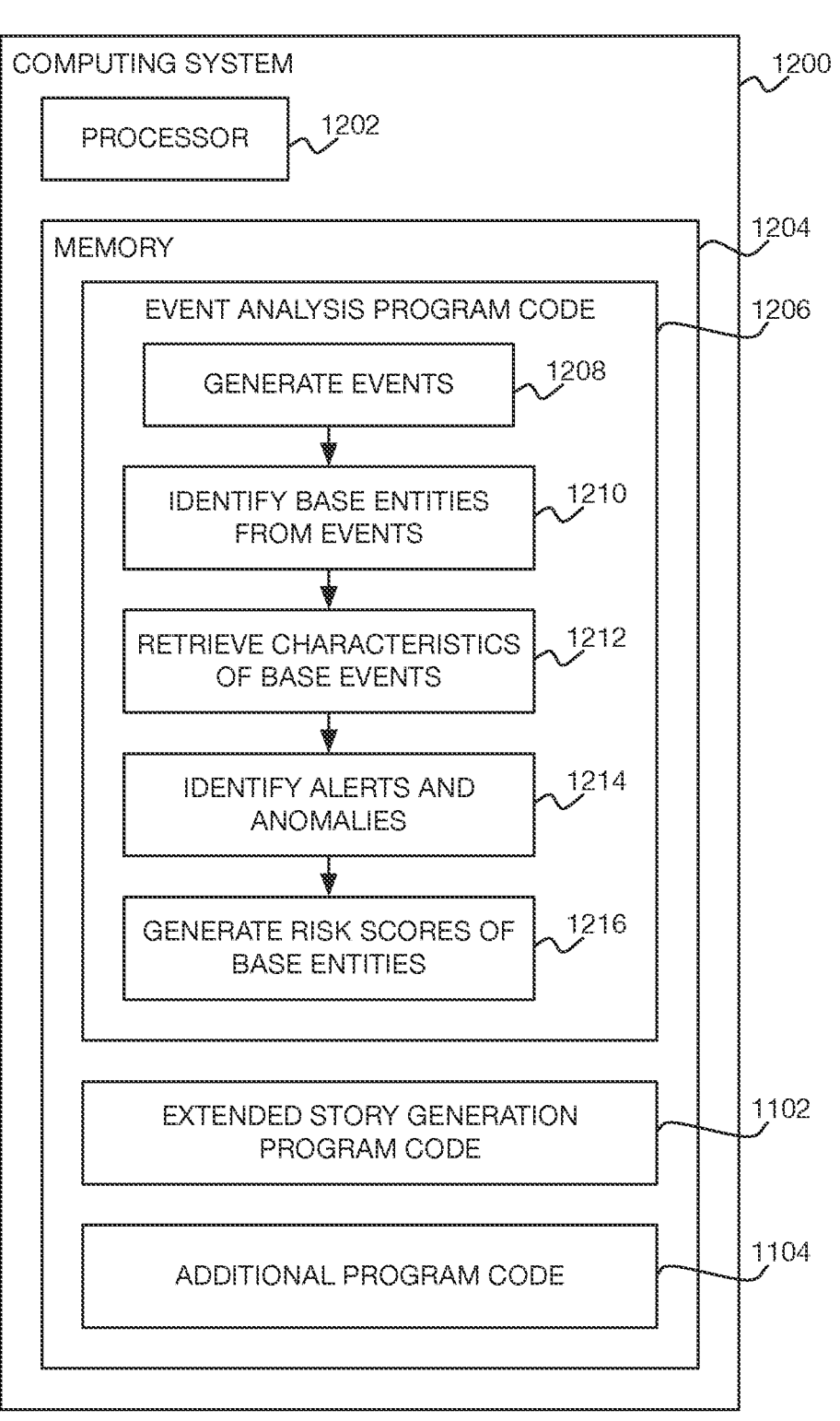
FIG. 12 is a diagram of an example computing system.

FIG. 12 shows an example computing system 1200. The computing system 1200 may be implemented as one or more computing devices. The computing system 1200 includes a processor 1202 and memory 1204, the latter which is a type of non-transitory computer-readable data storage medium. The memory 1204 stores the extended story generation program code 1102 that has been described, and can also the additional program code 1104 that has been described as well as event analysis program code 1206. The program code 1102, the program code 1104, and the program code 1206 are executable by the processor 1202.

The event analysis program code 1206 is executed before the extended story generation program code 1102, and then the additional program code 1104 is executed. Execution of the event analysis program code 1206 results in performance of processing, such as processing consistent with that of the '387 patent. For instance, the processing can include generating (normalized) events from raw security data (1208). Base entities can be identified from the events by identifying the base events that are referenced within the events (1210), and then characteristics of the base entities may be retrieved (1212), such as from an external database or other data store.

Alerts and anomalies are then identified from the received events (1214), and the risk scores of the base entities are generated based on the identified alerts and anomalies (1216). Therefore, the event analysis program code 1206 generates the information that is used by (and thus which is considered as previously generated information by) the extended story generation program code 1102. That is, the program code 1102 uses the information generated by the program code 1206 to generate core entities of base entities and base stories of core entities.

Techniques have been described for identifying security issues via generation of base stories that are networks of core entities having constituent base entities. The techniques provide a higher order analysis than that provided by just identifying simple stories that pertain to single base entities. Core entities are defined as combinations of related base entities, and base stories are defined as networks of core entities that relate to common security issues that have or have potentially occurred. The base stories therefore comprehensively define security issues that the base entities of these core entities may be experiencing.

Techniques have further been described for extending base stories with external content to generate extended stories. Such extended stories can even more comprehensively define the security issues of the base stories, and provide further narrative explanation of these security issues. Techniques have also been described for user interfaces for visually inspecting the stories in an interactive manner to aid in understanding the security issues as well as to improve narrative explanation of the stories.

The generation of core entities of base entities, and generation of base stories of core entities, and/or the extension of base stories with external content to generate extended stories can be performed using machine learning in some implementations. For example, as to the generation of core entities, as core entities are created, a machine learning model can be trained based on which base entities have been grouped together into which core entities. The identified characteristics of the base entities, as well the identified events (e.g., alerts and/or anomalies), may be also be provided as training data. Thereafter, when new core entities are to be created, the identified base entities can be input into the trained model, along with their identified characteristics and the identified events) to receive identification of core entities as output (i.e., which base entities should be grouped together as core entities).

Similarly, as to the generation of base stories, as base stories are created, a machine learning model can be trained based on which core entities have been grouped together into which base stories. The constituent base entities of the core entities, as well as the identified events (e.g., alerts and/or anomalies), may also be provided as training data. Therefore, when new base stories are to be created, the core entities can be input into the trained model, along with their constituent base entities and the identified events to receive identification of base stories as output (i.e., which core entities should be grouped together within base stories).

As to the extension of base stories to generate extended stories, as base stories are extended with external content, a machine learning model can be trained based on which base stories have been extended with which external content. The constituent base entities of the core entities of the stories, as well as the events (e.g., alert and/or anomalies) and the external content, may also be provided as training data. When a new extended story is to be created, a base story may be input (as defined at least by its constituent core entities), along with external content, identified events, and the constituent base entities of the core entities of the base story, to receive identification of which external content should be added to which core entities of the base story as the extended story.

In furtherance and in addition to the above, the techniques described herein, in some implementations, are directed toward improvements and enhancements to computer security risk assessment. Computer security risk assessment methods, systems, and computer programming products include generating, by a processor, relationships between and among entities, such entities comprising user entities and device entities the same or like the base entities described hereinabove. Further, entity clusters are generated based on relationships between the one or more entities, such entity clusters the same or like the core entities described hereinabove.

Entity cluster networks are generated based on connections between the entity clusters, and such entity cluster networks may be the same or like base stories described hereinabove. A risk for each entity cluster network is generated by generating a risk for each entity cluster in the entity cluster network, generating a risk for each user entity in each entity cluster, and generating a risk for each device entity in each entity cluster. Next, an overall risk is generated for each entity cluster based on the risk for each user entity and the risk for each device entity in each entity cluster.

Further, a risk for each entity cluster network is generated based on the combining and assessing of the overall risk for each entity cluster in the entity cluster network. The entity cluster networks are ranked according to their risk scores. These entity cluster networks are displayed, in some embodiments, according to the risk ranking, to enable a user to select a particular entity cluster network for review, analysis and to initiate or perform an action to mitigate a security risk or threat. The user may be a threat hunter as described above. In further implementations, an entity cluster network is automatically selected by a computer for display to the user.

In this way, the techniques described herein provide many significant advantages including, but not limited to, the reduction of voluminous amounts of captured data much of which is not relevant to security threats or issues, effective and enhanced organization of entity, event, and relationship data that feed into security threat monitoring, assessment, and mitigation, and the generation and percolation of the most significant security threat stories thru multi-parameter risk score ranking for presentation to threat hunters. Such threat hunters, assisted by the inventive techniques described herein, are better able to focus threat monitoring and analysis, and act to mitigate and thwart security threats.

In some implementations, entity relationships that form an entity cluster include a user of an organization, a device of the organization and a relationship therebetween. For example, an entity cluster could include a "login" event of a user to a workstation. In still other implementations, entity relationships are directed to behaviors that characterize and comprise entities, such as that a group of anomalous processes were executed by (or in the name of) a user on a mobile device. Yet another example of relationships between and among entities that form entity clusters could include a commonality between two user groups, where such user groups include many of the same users.

Furthermore, entities can be said to have simple risk scores. These include raw risk scores that may be precomputed based on entity attributes and behaviors and such raw risk scores may be combined to derive an overall risk of an entity cluster that includes the entities. A variety of methods may be used to derive the risk score of an entity cluster. For example, the risk scores for the entities may be weighted based on, in some embodiments, the significance of the user (for example, the user may be a member of the executive leadership team or may be an unvetted third-party contractor), and/or the significance of a device (for example, the device may be a primary proxy server of an organization, or a third-party device temporarily connected to the network for forensics data download).

In further implementations of the computer risk assessment techniques described herein, entity cluster networks are extended with external content, which may include external users and devices. Such external content can be said to provide an extended context to enrich the entity data and relationships. Advantageously, such external content leverages information from outside systems setup to monitor and memorialize users, devices, and networks, which may exist not only in a network of an organization (which may be referred to as an intranet) but also an external network such as the Internet, from which many security threats originate and infiltrate an organization. External content may include a list of known problematic internet protocol addresses, a list of known problematic processes, a list of know problematic hashes, human resources data, and classified information.

The external content, in some implementations, may include risk determinations which may be leveraged to further assess not only risks for entities themselves, but also the entity clusters. External content may be leveraged to add connections within entity cluster networks. In a nonlimiting example, an external internet protocol address that poses a known risk may be accessed by two unconnected entity clusters. Such common access points may serve as the basis to generate a new connection between the two entity clusters.

In some embodiments, the connections between entity clusters comprise one or more of the following:

an anomaly (one non limiting example of which can be an unusual number of port scans on a device entity);
   an alert (such as the occurrence of a process being blocked);
   a correlation rule (one non limiting example of which can be a process and the time of execution of the process);
   a correlation anomaly (such as two anomalies which occur within a short time span);
   a similarity connection (such as two devices that have blocked separate instances of the same process);
   an organization anomaly (such as an anomaly that occurs across an organization which may be characteristic of a brute force malware attack);
   a shared external entity (such as an Internet server at an internet protocol address being accessed by two users and/or two devices);
   a usage of a shared entity (one non limiting example of which can be a website navigated by multiple users of an organization); and
   a user-defined connection, which is custom connection relevant to a particular organization's application, environment, etc.

Such connections may be characterized by a connection risk used to generate the risk for each entity cluster network.

In some implementations, a display is generated of one of the entity cluster networks based on the entity cluster network risk rankings. Here, the display comprises the entities, arranged in a circular pattern, for each of the entity clusters, the relationships between the entities, and the connections between the entity clusters in the displayed entity cluster network. Moreover, the relationships are displayed as paths within the circular pattern and the connections are displayed as paths within the circular pattern. In yet further embodiments, a label is generated adjacent to each of the displayed entities, the label oriented radially and adjacent to the circular pattern.

A part or all of the above-noted implementations can be described per the following supplementary notes, but not limited thereto.

Supplementary Note 1

A method comprising:
   defining, by a processor, a plurality of core entities, each core entity defined as a subset of base entities selected from a plurality of base entities such that the subset satisfies one or more core entity connection relationships;
   defining, by the processor, a plurality of base stories, each base story defined as a subset of core entities selected from the plurality of core entities such that the subset satisfies one or more story connection relationships;
   calculating, by the processor, a risk score of each core entity based on previously calculated risk scores of the base entities of the core entity;
   calculating, by the processor, a risk score of each base story based on the calculated risk score of each core entity of the base story;
   selecting, by the processor, one or more of the base stories based on the risk scores of the base stories; and
   extending, by the processor, the selected base stories with external content to generate corresponding extended stories.

Supplementary Note 2

The method of supplementary note 1, further comprising:
   displaying, by the processor, the corresponding extended stories within an interactive user interface that permits a user to visually inspect connections among the base entities of the core entities of a selected corresponding extended story.

Supplementary Note 3

The method of supplementary note 1, further comprising:
   performing, by the processor, an action in relation to the base entities of the core entities of a selected corresponding extended story to resolve an anomaly contributing to the risk score of the selected corresponding extended story, in order to lower the risk score.

Supplementary Note 4

The method of supplementary note 3, wherein performing the action comprises reconfiguring the base entities of the core entities of the selected corresponding extended story.

Supplementary Note 5

The method of supplementary note 1, wherein the base entities comprise users, devices, and device-associated users, such that the core entities each comprise a combination of the users, the devices, and the device-associated users that are related to one another by the core entity connection relationships, wherein the risk score of each base entity is indicative of the base entity being subjected to any security issue, and wherein the risk score of each core entity is indicative of the base entities of core entity as a whole being subjected to any security issue.

Supplementary Note 6

The method of supplementary note 5, wherein the base stories each comprise the core entities that relate to a common security issue over a plurality of events within a period of time, and wherein the risk score of each base story is indicative of the core entities of the base story being subjected to the common security issue.

Supplementary Note 7

The method of supplementary note 6, wherein, for each selected base story, the extended story providing further definition of the common security issue via the external content.

Supplementary Note 8

The method of supplementary note 5, wherein the core entity connection relationships that the subset of base entities of each core entity satisfy comprise one or multiple of:

a common entity characteristic relationship such that multiple entities have a common characteristic, where each of the multiple entities is one of the users, the devices, or the device-associated users; and a common behavior characteristic relationship such that the multiple entities have a common behavior.

Supplementary Note 9

The method of supplementary note 5, wherein the core entity connection relationships that the subset of base entities of each core entity satisfy comprise one or multiple of:

a same device-multiple user relationship such that multiple users use a same device;

a same user-multiple device relationship such that a same user or a same device-associated user is active on multiple devices; and a multiple entity-event relationship such that a first entity and a second entity are part of a same event, where each of the first and second entities is one of the users, the devices, or the device-associated users.

Supplementary Note 10

The method of supplementary note 5, wherein the story connection relationships that define the subset of core entities of each base story comprise one or multiple of:

a multiple entity-anomaly or multiple entity-alert relationship such that a base entity of a first core entity and a base entity of a second core entity are part of a same anomaly or alert, where the base entity of each of the first and second core entities is one of the users, the devices, or the device-associated users; and a multiple entity-common anomaly or multiple entity-common alert relationship such that the base entity of the first core entity and the base entity of the second core entity were subject to a same type of anomaly or alert.

Supplementary Note 11

The method of supplementary note 1, wherein the external content comprises one or multiple of:

a list of network addresses that have been identified as being potentially dangerous; and a list of processes that have been identified as rarely occurring.

Supplementary Note 12

A non-transitory computer-readable data storage medium storing program code executable by a processor to perform processing comprising:

receiving previously identified base entities and characteristics thereof, previously identified alerts of events that have occurred and that are of interest, previously identified anomalies of the events, and previously generated risk scores of the base entities indicative of the base entities being subjected to any security issue;

identifying, as a plurality of core entities, a plurality of base entity combinations that each include a subset of base entities that either or both have a common characteristic and exhibit common behavior, based on the characteristics and the previously identified alerts that have been received;

identifying, as a plurality of base stories, a plurality of networks of the core entities that each relate to a common security issue over a subset of the events within a period of time, based on the previously identified anomalies that have been received;

calculating a risk score of each core entity based on the previously generated risk scores of the base entities;

calculating a risk score of each base story based on the calculated risk score of each core entity of the base story.

Supplementary Note 13

The non-transitory computer-readable data storage medium of supplementary note 12; wherein the processing further comprises:

extending the base stories with external content to generate corresponding extended stories to provide further definition of the common security issue via the external content.

Supplementary Note 14

The non-transitory computer-readable data storage medium of supplementary note 13, wherein extending the base stories with the external content comprises, for each base story:

selecting the previously identified alerts and anomalies that reference any base entity of any core entity of the base story and any entity indicated in the external content; and adding the events of the selected previously identified alerts and anomalies to the base story to generate an extended story corresponding to the base story.

Supplementary Note 15

The non-transitory computer-readable data storage medium of supplementary note 13, wherein the processing further comprises:

displaying the corresponding extended stories within an interactive user interface that permits a user to visually inspect connections among the base entities of the core entities of a selected corresponding extended story.

Supplementary Note 16

The non-transitory computer-readable data storage medium of supplementary note 13, wherein the processing further comprises:

reconfiguring the base entities of the core entities of a selected corresponding extended story to lower the risk score of the corresponding extended story.

Supplementary Note 17

The non-transitory computer-readable data storage medium of supplementary note 12, wherein identifying, as the core entities, the base entity combinations comprises:

identifying each base entity combination that, based on the characteristics and the previously identified alerts, satisfies one or more core entity connection relationships that comprise one or multiple of:

a same device-multiple user relationship such that multiple users use a same device;

a same user-multiple device relationship such that a same user or a same device-associated user is active on multiple devices; and a multiple entity-event relationship such that a first entity and a second entity are part of a same event, where each of the first and second entities is a user, a device, or a device-associated user.

Supplementary Note 18

The non-transitory computer-readable data storage medium of supplementary note 17, wherein identifying, as the base stories, the networks of the core entities comprises:

identifying each network of the core entities that, based on the previously identified alerts and the previously identified anomalies, satisfies one or more story connection relationships that comprise one or multiple of:

a multiple entity-anomaly or multiple entity-alert relationship such that a base entity of a first core entity and a base entity of a second core entity are part of a same anomaly or alert, where the base entity of each of the first and second core entities is one of a user, a device, or a device-associated user; and a multiple entity-common anomaly or multiple entity-common alert relationship such that the base entity of the first core entity and the base entity of the second core entity were subject to a same type of anomaly or alert.

Supplementary Note 19

A computing system comprising:

a processor; and a memory storing extended story generation program code to:

receive previously identified base entities and characteristics thereof, previously identified alerts of events that have occurred and that are of interest, previously identified anomalies of the events, and previously generated risk scores of the base entities indicative of the base entities being subjected to any security issue;

identify, as a plurality of core entities, a plurality of base entity combinations that each include a subset of base entities that either or both have a common characteristic and exhibit common behavior, based on the characteristics and the previously identified alerts that have been received;

identify, as a plurality of base stories, a plurality of networks of the core entities that each relate to a common security issue over a subset of the events within a period of time, based on the previously identified anomalies that have been received;

calculate a risk score of each core entity based on the previously generated risk scores of the base entities;

calculate a risk score of each base story based on the calculated risk score of each core entity of the base story; and extend the base stories with external content to generate corresponding extended stories to provide further definition of the common security issue via the external content.

Supplementary Note 20

The computing system of supplementary note 19, wherein the memory further stores event analysis program code executable by the processor to:

generate the events;

identify the base entities from the generated events;

retrieve the characteristics of the identified base entities;

identify the alerts and the anomalies from the generated events; and generate the risk scores of the base entities, based on the identified alerts and anomalies, wherein the event analysis program code is executed before the extended story generation program code.

We claim:

1. A method comprising:

defining, by a processor, a plurality of core entities, each core entity defined as a subset of base entities selected from a plurality of base entities such that the subset satisfies one or more core entity connection relationships;

defining, by the processor, a plurality of base stories, each base story defined as a subset of core entities selected from the plurality of core entities such that the subset satisfies one or more story connection relationships;

calculating, by the processor, a risk score of each core entity based on previously calculated risk scores of the base entities of the core entity;

calculating, by the processor, a risk score of each base story based on the calculated risk score of each core entity of the base story;

selecting, by the processor, one or more of the base stories; and extending, by the processor, the selected base stories with external content to generate corresponding extended stories.

2. The method of claim 1, further comprising:

displaying, by the processor, the corresponding extended stories within an interactive user interface that permits a user to visually inspect connections among the base entities of the core entities of a selected corresponding extended story.

3. The method of claim 1, further comprising:

performing, by the processor, an action in relation to the base entities of the core entities of a selected corresponding extended story to resolve an anomaly contributing to the risk score of the selected corresponding extended story, in order to lower the risk score.

4. The method of claim 3, wherein performing the action comprises reconfiguring the base entities of the core entities of the selected corresponding extended story.

5. The method of claim 1, wherein the base entities comprise users, devices, and device-associated users, such that the core entities each comprise a combination of the users, the devices, and the device-associated users that are related to one another by the core entity connection relationships, wherein the risk score of each base entity is indicative of the base entity being subjected to any security issue, and wherein the risk score of each core entity is indicative of the base entities of core entity as a whole being subjected to any security issue.

6. The method of claim 5, wherein the base stories each comprise the core entities that relate to a common security issue over a plurality of events within a period of time, and wherein the risk score of each base story is indicative of the core entities of the base story being subjected to the common security issue.

7. The method of claim 6, wherein, for each selected base story, the extended story providing further definition of the common security issue via the external content.

8. The method of claim 5, wherein the core entity connection relationships that the subset of base entities of each core entity satisfy comprise one or multiple of:

a common entity characteristic relationship such that multiple entities have a common characteristic, where each of the multiple entities is one of the users, the devices, or the device-associated users; and a common behavior characteristic relationship such that the multiple entities have a common behavior.

9. The method of claim 5, wherein the core entity connection relationships that the subset of base entities of each core entity satisfy comprise one or multiple of:

a same device-multiple user relationship such that multiple users use a same device;

a same user-multiple device relationship such that a same user or a same device-associated user is active on multiple devices; and a multiple entity-event relationship such that a first entity and a second entity are part of a same event, where each of the first and second entities is one of the users, the devices, or the device-associated users.

10. The method of claim 5, wherein the story connection relationships that define the subset of core entities of each base story comprise one or multiple of:

a multiple entity-anomaly or multiple entity-alert relationship such that a base entity of a first core entity and a base entity of a second core entity are part of a same anomaly or alert, where the base entity of each of the first and second core entities is one of the users, the devices, or the device-associated users; and a multiple entity-common anomaly or multiple entity-common alert relationship such that the base entity of the first core entity and the base entity of the second core entity were subject to a same type of anomaly or alert.

11. The method of claim 1, wherein the external content comprises one or multiple of:

a list of network addresses that have been identified as being potentially dangerous; and a list of hashes of file binaries that are known to be malicious.

12. A non-transitory computer-readable data storage medium storing program code executable by a processor to perform processing comprising:

receiving previously identified base entities and characteristics thereof, previously identified alerts of events that have occurred and that are of interest, previously identified anomalies of the events, and previously generated risk scores of the base entities indicative of the base entities being subjected to any security issue;

identifying, as a plurality of core entities, a plurality of base entity combinations that each include a subset of base entities that either or both have a common characteristic and exhibit common behavior, based on the characteristics and the previously identified alerts that have been received;

identifying, as a plurality of base stories, a plurality of networks of the core entities that each relate to a common security issue over a subset of the events within a period of time, based on the previously identified anomalies that have been received;

calculating a risk score of each core entity based on the previously generated risk scores of the base entities;

calculating a risk score of each base story based on the calculated risk score of each core entity of the base story.

13. The non-transitory computer-readable data storage medium of claim 12, wherein the processing further comprises:

extending the base stories with external content to generate corresponding extended stories to provide further definition of the common security issue via the external content.

14. The non-transitory computer-readable data storage medium of claim 13, wherein extending the base stories with the external content comprises, for each base story:

selecting the previously identified alerts and anomalies that reference any base entity of any core entity of the base story and any entity indicated in the external content; and adding the events of the selected previously identified alerts and anomalies to the base story to generate an extended story corresponding to the base story.

15. The non-transitory computer-readable data storage medium of claim 13, wherein the processing further comprises:

displaying the corresponding extended stories within an interactive user interface that permits a user to visually inspect connections among the base entities of the core entities of a selected corresponding extended story.

16. The non-transitory computer-readable data storage medium of claim 13, wherein the processing further comprises:

reconfiguring the base entities of the core entities of a selected corresponding extended story to lower the risk score of the corresponding extended story.

17. The non-transitory computer-readable data storage medium of claim 12, wherein identifying, as the core entities, the base entity combinations comprises:

identifying each base entity combination that, based on the characteristics and the previously identified alerts, satisfies one or more core entity connection relationships that comprise one or multiple of:

a same device-multiple user relationship such that multiple users use a same device;

a same user-multiple device relationship such that a same user or a same device-associated user is active on multiple devices; and a multiple entity-event relationship such that a first entity and a second entity are part of a same event, where each of the first and second entities is a user, a device, or a device-associated user.

18. The non-transitory computer-readable data storage medium of claim 17, wherein identifying, as the base stories, the networks of the core entities comprises:

identifying each network of the core entities that, based on the previously identified alerts and the previously identified anomalies, satisfies one or more story connection relationships that comprise one or multiple of:

a multiple entity-anomaly or multiple entity-alert relationship such that a base entity of a first core entity and a base entity of a second core entity are part of a same anomaly or alert, where the base entity of each of the first and second core entities is one of a user, a device, or a device-associated user; and a multiple entity-common anomaly or multiple entity-common alert relationship such that the base entity of the first core entity and the base entity of the second core entity were subject to a same type of anomaly or alert.

19. A computing system comprising:

a processor; and a memory storing extended story generation program code to:

receive previously identified base entities and characteristics thereof, previously identified alerts of events that have occurred and that are of interest, previously identified anomalies of the events, and previously generated risk scores of the base entities indicative of the base entities being subjected to any security issue;

identify, as a plurality of core entities, a plurality of base entity combinations that each include a subset of base entities that either or both have a common characteristic and exhibit common behavior, based on the characteristics and the previously identified alerts that have been received;

identify, as a plurality of base stories, a plurality of networks of the core entities that each relate to a common security issue over a subset of the events within a period of time, based on the previously identified anomalies that have been received;

calculate a risk score of each core entity based on the previously generated risk scores of the base entities;

calculate a risk score of each base story based on the calculated risk score of each core entity of the base story; and extend the base stories with external content to generate corresponding extended stories to provide further definition of the common security issue via the external content.

20. The computing system of claim 19, wherein the memory further stores event analysis program code executable by the processor to:

generate the events;

identify the base entities from the generated events;

retrieve the characteristics of the identified base entities;

identify the alerts and the anomalies from the generated events; and generate the risk scores of the base entities, based on the identified alerts and anomalies, wherein the event analysis program code is executed before the extended story generation program code.

* * * * *